US 11,714,049 B2

(12) United States Patent
Yamauchi et al.

(10) Patent No.: US 11,714,049 B2
(45) Date of Patent: Aug. 1, 2023

(54) METHOD FOR SURFACE PLASMON RESONANCE FLUORESCENCE ANALYSIS AND DEVICE FOR SURFACE PLASMON RESONANCE FLUORESCENCE ANALYSIS

(71) Applicant: Otsuka Pharmaceutical Co., Ltd., Tokyo (JP)

(72) Inventors: Nobuhiro Yamauchi, Tokyo (JP); Yuichi Kyogoku, Tokyo (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 0 days.

(21) Appl. No.: 17/673,051

(22) Filed: Feb. 16, 2022

(65) Prior Publication Data

US 2022/0170856 A1   Jun. 2, 2022

Related U.S. Application Data

(62) Division of application No. 15/771,879, filed as application No. PCT/JP2016/082202 on Oct. 31, 2016, now abandoned.

(30) Foreign Application Priority Data

Nov. 13, 2015   (JP) ................ 2015-223059

(51) Int. Cl.
*G01N 21/64* (2006.01)
*G01N 21/13* (2006.01)
(Continued)

(52) U.S. Cl.
CPC ........... *G01N 21/648* (2013.01); *G01N 21/13* (2013.01); *G01N 21/41* (2013.01); *G01N 21/553* (2013.01); *G01N 2021/8455* (2013.01)

(58) Field of Classification Search
CPC ................ G01N 21/41; G01N 21/553; G01N 2021/8455; G01N 21/13; G01N 21/648
See application file for complete search history.

(56) References Cited

U.S. PATENT DOCUMENTS 4,558,014 A * 12/1985 Hirschfeld ......... G01N 33/5302
250/365
4,945,254 A    7/1990 Robbins
(Continued)

FOREIGN PATENT DOCUMENTS

JP   2001215200 A   8/2001
JP   2002045329 A   2/2002
(Continued)

OTHER PUBLICATIONS

International Search Report dated Jan. 31, 2017 for PCT/JP2016/082202.
(Continued)

*Primary Examiner* — Violeta A Prieto
(74) *Attorney, Agent, or Firm* — Lucas & Mercanti, LLP

(57) ABSTRACT

The present invention includes a prism having a light incidence surface and a film formation surface, a metal film disposed on the film formation surface, and a trapping body secured to the metal film. Excitation light is irradiated from an excitation light irradiation part onto an analysis chip installed in a chip holder, and excitation light reflected by the analysis chip is detected. The information outputted by the excitation light irradiation part is acquired.

13 Claims, 16 Drawing Sheets

(51) Int. Cl.
*G01N 21/41* (2006.01)
*G01N 21/552* (2014.01)
*G01N 21/84* (2006.01)

(56) References Cited

U.S. PATENT DOCUMENTS

| | | | |
|---|---|---|---|
| 6,201,607 B1 | 3/2001 | Roth et al. | |
| 7,375,813 B2 | 5/2008 | Wolf et al. | |
| 7,593,107 B2 | 9/2009 | Wolf et al. | |
| 9,535,004 B2 | 1/2017 | Noda et al. | |
| 9,575,303 B2 | 2/2017 | Takamizawa | |
| 2002/0016620 A1* | 2/2002 | Tsujita | A61B 1/00009 607/88 |
| 2002/0044324 A1 | 4/2002 | Hoshida et al. | |
| 2006/0087654 A1 | 4/2006 | Wolf et al. | |
| 2006/0181709 A1 | 8/2006 | Wolf et al. | |
| 2009/0091652 A1 | 4/2009 | Wernersson | |
| 2012/0182275 A1 | 7/2012 | Chen | |
| 2013/0078146 A1 | 3/2013 | Sando | |
| 2013/0175457 A1 | 7/2013 | Wada | |
| 2013/0314775 A1 | 11/2013 | Takamizawa | |
| 2015/0025341 A1 | 1/2015 | Sakota et al. | |
| 2015/0109432 A1 | 4/2015 | Dixon et al. | |
| 2016/0153910 A1* | 6/2016 | Fujii | G01B 21/6428 422/69 |
| 2016/0245746 A1* | 8/2016 | Noda | G01N 21/553 |
| 2016/0356717 A1* | 12/2016 | Fujii | G01N 33/54373 |
| 2016/0370289 A1 | 12/2016 | Hikage et al. | |
| 2017/0016823 A1 | 1/2017 | Tamura et al. | |
| 2017/0017071 A1* | 1/2017 | Ue | G01N 21/41 |
| 2017/0138899 A1* | 5/2017 | Itabashi | G01N 21/658 |
| 2018/0313756 A1* | 11/2018 | Yamauchi | G01N 21/41 |

FOREIGN PATENT DOCUMENTS

| | | |
|---|---|---|
| JP | 2007047110 A | 2/2007 |
| JP | 2012098256 A | 5/2012 |
| WO | 02/17010 A1 | 2/2002 |
| WO | 2006047192 A1 | 5/2006 |
| WO | 2012172987 A1 | 12/2012 |
| WO | 2013027544 A1 | 2/2013 |
| WO | 2015064704 A1 | 5/2015 |

OTHER PUBLICATIONS

Written Opinion of the International Searching Authority dated Jan. 31, 2017 from corresponding International Application No. PCT/JP2016/082202 and English translation.

Extended European Search Report dated Aug. 22, 2018 from corresponding European Application No. EP 16864052.2.

Notice of Reasons for Refusal for corresponding Japanese Patent Application No. 2017-550067 dated drafted Nov. 29, 2019 with English translation (6 pages).

\* cited by examiner

METHOD FOR SURFACE PLASMON RESONANCE FLUORESCENCE ANALYSIS AND DEVICE FOR SURFACE PLASMON RESONANCE FLUORESCENCE ANALYSIS

CROSS REFERENCE TO RELATED APPLICATION

This Application is division of U.S. application Ser. No. 15/771,879 filed Apr. 27, 2018, which is a 371 of PCT/JP2016/082202 filed on Oct. 31, 2016 which, in turn, claimed the priority of Japanese Patent Application No. 2015-223059 filed on Nov. 13, 2015, all applications are incorporated herein by reference.

TECHNICAL FIELD

The present invention relates to a surface plasmon resonance fluorescence analysis method and a surface plasmon resonance fluorescence analysis apparatus that detect a detection object substance in a sample solution with use of surface plasmon resonance (SPR).

BACKGROUND ART

When trace substances can be quantitatively detected with high sensitivity in measurement for detection of biological substances such as protein and DNA, determination of the patient's condition and treatment can be promptly carried out. In view of this, an analysis method and an analysis apparatus for quantitatively detecting weak light generated by a very small amount detection object substance with high sensitivity are demanded. As an example of a method of detecting a detection object substance with high sensitivity, a surface plasmon resonance fluorescence analysis method (Surface Plasmon-field enhanced Fluorescence Spectroscopy (SPFS)) is known (see, for example, PTL 1).

The SPFS uses a prism including a metal film disposed on a predetermined surface. When the metal film is irradiated with excitation light from an excitation light irradiating section through the prism at an angle that causes a surface plasmon resonance, localized light (enhanced electric field) can be generated on the surface of the metal film. With the localized light, a fluorescence material labelling the detection object substance captured on the metal film is excited, and therefore the presence or the amount of the detection object substance can be detected by detecting the fluorescence emitted from the fluorescence material.

CITATION LIST

Patent Literature

PTL 1
WO2012/172987

SUMMARY OF INVENTION

Technical Problem

In general, in an SPFS, the SPFS apparatus is provided with a light receiving sensor for measuring excitation light, and whether the excitation light irradiating section is in a normal condition is checked from the viewpoint of preventing detection errors due to a lowered power of an excitation light irradiating section. In the case where a light receiving sensor (for example, a photodiode (PD)) and a high-power (for example, 1 m W/mm$^2$ or greater) excitation light source are used, when the power of the light source is excessively high, an excessively large quantity of excitation light is detected and consequently the light receiving sensor is saturated in some situation. When the light receiving sensor is saturated in this manner, the linearity of the output of light receiving sensor is lost, and accurate measurement cannot be performed. As a result, whether the excitation light irradiating section is in a normal condition cannot be correctly determined in some situation. In view of this, to prevent the saturation of the light receiving sensor, a light quantity adjustment means such as a neutral density (ND) filter and a light diffusion plate are used together with the light receiving sensor.

However, the above-mentioned light quantity adjustment means is influenced by aging, dust in the use environment, and the like. Therefore, to perform precise measurement, maintenance of the light quantity adjustment means such as replacing and cleaning of the light quantity adjustment means has to be periodically performed to eliminate the influence.

An object of the present invention is to provide a surface plasmon resonance fluorescence analysis method and a surface plasmon resonance fluorescence analysis apparatus that can correctly determine whether an excitation light irradiating section is in a normal condition without separately using a light quantity adjustment means in the case where a high-power light source is used.

Solution to Problem

To solve the above-mentioned problems, a surface plasmon resonance fluorescence analysis method according to embodiments of the present invention is a method of detecting presence or an amount of a detection object substance by detecting fluorescence that is emitted by a fluorescence material labelling the detection object substance when the fluorescence material is excited by localized light based on a surface plasmon resonance, the surface plasmon resonance fluorescence analysis method including: acquiring output information of an excitation light irradiating section by applying excitation light from the excitation light irradiating section to an analysis chip installed in a chip holder, and by detecting excitation light reflected by the analysis chip, the analysis chip including a prism including an incidence surface and a film formation surface, a metal film disposed on the film formation surface, and a capturing body fixed on the metal film.

In addition, to solve the above-mentioned problems, a surface plasmon resonance fluorescence analysis apparatus according to embodiments of the present invention detects presence or an amount of a detection object substance by detecting fluorescence that is emitted by a fluorescence material labelling the detection object substance when the fluorescence material is excited by localized light based on a surface plasmon resonance, the surface plasmon resonance fluorescence analysis apparatus including: a chip holder for detachably holding an analysis chip including a prism including an incidence surface and a film formation surface, a metal film disposed on the film formation surface, and a capturing body fixed on the metal film; an excitation light irradiating section that applies excitation light to the analysis chip held by the chip holder; an excitation light detecting section that detects excitation light reflected by the analysis chip; a fluorescence detecting section that detects fluorescence emitted from the fluorescence material labelling the detection object substance captured by the capturing body;

and a processing section that acquires output information of the excitation light irradiating section based on a detection result of the excitation light detecting section.

Advantageous Effects of Invention

According to the present invention, it is possible to correctly determine whether an excitation light irradiating section is in a normal condition without separately using a light quantity adjustment means in the case where a high-power light source is used, and it is thus possible to prevent detection errors due to abnormality in the excitation light irradiating section. In addition, the task and the cost for maintenance such as replacing and cleaning of a light quantity adjusting component can be reduced.

DESCRIPTION OF EMBODIMENTS

Embodiments of the present invention are elaborated below with reference to the accompanying drawings.

Embodiment 1

In Embodiment 1, a surface plasmon resonance fluorescence analysis apparatus (SPFS apparatus) that can acquire, as output information of an excitation light irradiating unit (excitation light irradiating section), information relating to the power of the excitation light irradiating unit is described.

Figure 1:
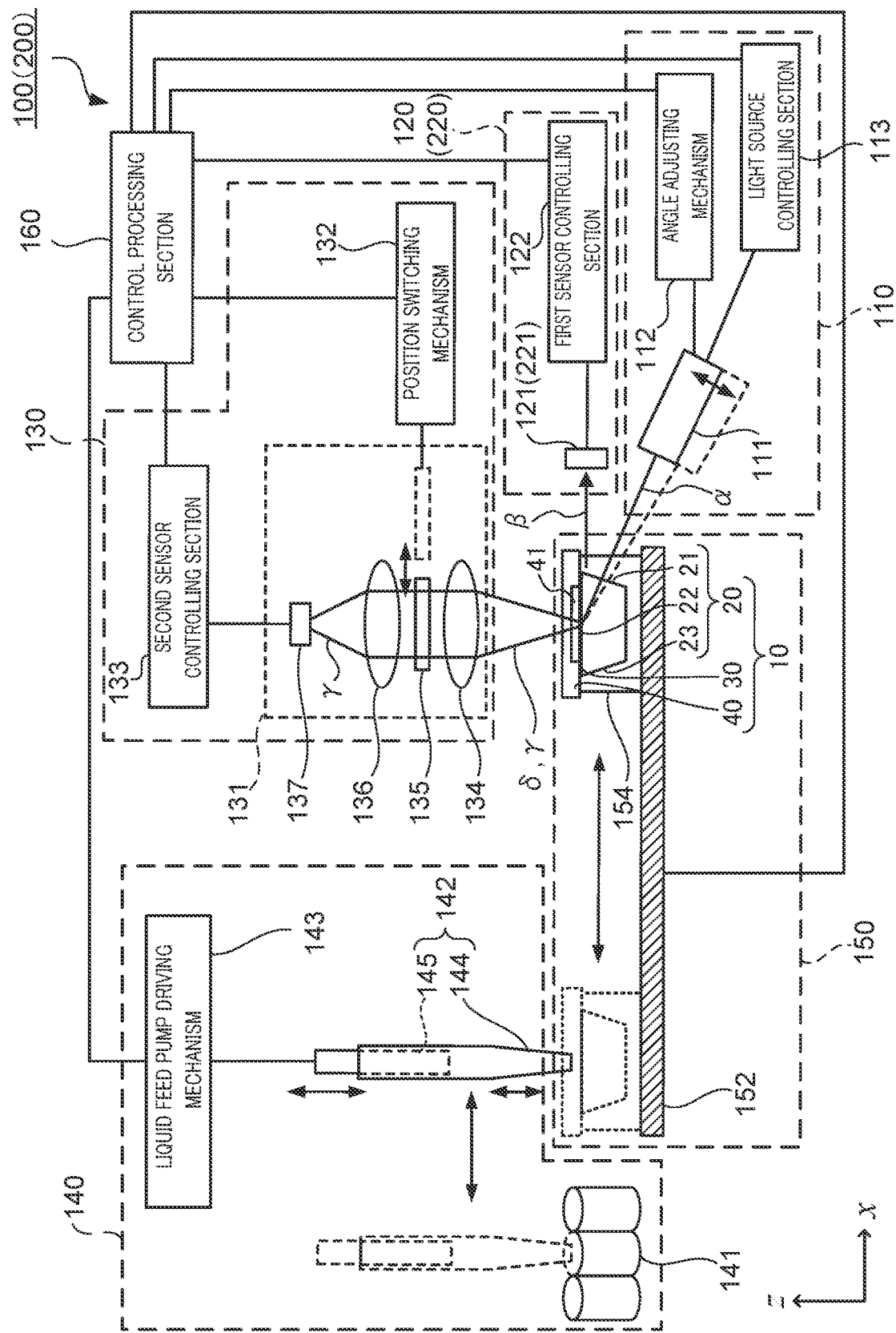
FIG. 1 schematically illustrates a configuration of an SPFS apparatus according to Embodiments 1 and 2 of the present invention.

FIG. 1 is a schematic view illustrating a configuration of SPFS device 100 according to Embodiment 1 of the present invention. As illustrated in FIG. 1, SPFS apparatus 100 includes excitation light irradiating unit (excitation light irradiating section) 110, excitation light detecting unit (excitation light detecting section) 120, fluorescence detecting unit (fluorescence detecting section) 130, liquid feeding unit 140, conveyance unit 150 and control processing section (processing section) 160. SPFS device 100 is used in a state where analysis chip 10 is attached to chip holder 154 of conveyance unit 150. For such a configuration, analysis chip 10 is described first, and each component of SPFS device 100 is described after the description of analysis chip 10.

Configuration of Detection Chip

Analysis chip 10 includes prism 20 including incidence surface 21, film formation surface 22 and emission surface 23, metal film 30 formed on film formation surface 22, and channel closure 40 disposed on film formation surface 22 or metal film 30. Normally, analysis chip 10 is replaced for each analysis. Analysis chip 10 is preferably a structure with each side of several millimeters to several centimeters, but may be a smaller structure or a larger structure that are not categorized as "chip."

Prism 20 is a dielectric that is transparent to excitation light α. Prism 20 includes incidence surface 21, film formation surface 22 and emission surface 23. Incidence surface 21 allows a large part of excitation light α from excitation light irradiating unit 110 to enter prism 20, and reflects a part of excitation light α from excitation light irradiating unit 110. In excitation light α from excitation light irradiating unit 110, the proportion in light quantity (reflectivity) of excitation light α that is reflected by incidence surface 21 (hereinafter referred to also as "reflection light β") depends on the refractive index of prism 20, the refractive index of the gas around prism 20, and the incident angle of excitation light α to incidence surface 21 (see the reference experiment described later). Normally, prism 20 is surrounded by air, and accordingly the reflectivity is substantially constant when the same the material of prism 20 and the same the incident angle of excitation light α are used. For example, when the material of prism 20 is a resin whose refractive index is 1.4 to 1.6, the reflectivity is approximately 4.2%. Metal film 30 is disposed on film formation surface 22. Excitation light α having entered prism 20 is reflected by the rear surface of metal film 30. To be more specific, excitation light α is reflected by an interface (film formation surface 22) between prism 20 and metal film 30. Emission surface 23 is a surface through which excitation light α reflected by metal film 30 is emitted out of prism 20.

The shape of prism 20 is not limited. In the present embodiment, the shape of prism 20 has a columnar shape whose bottom surface has a trapezoidal shape. The surface corresponding to one leg is incidence surface 21, and the surface corresponding to the other leg is emission surface 23. Preferably, the trapezoid serving as the bottom surface is an isosceles trapezoid. With such a configuration, incidence surface 21 and emission surface 23 are symmetrical, and the S wave component of excitation light α does not easily remain in prism 20.

Incidence surface 21 is formed such that excitation light α does not return to excitation light irradiating unit 110. When excitation light α returns to a laser diode (hereinafter also referred to as "LD") in the case where the light source of excitation light α is the LD, the excitation state of the LD is disturbed, and the wavelength and the output of excitation light α are varied. In view of this, the angle of incidence surface 21 is set within a scanning range around the ideal enhancement angle such that that excitation light α is not perpendicularly incident on incidence surface 21. Here, the "enhancement angle" is an incident angle at which the quantity of scattering light (hereinafter referred to as "plasmon scattering light") δ having a wavelength equal to that of excitation light α emitted upward of analysis chip 10 is maximized when the incident angle of excitation light α with respect to metal film 30 is scanned. In the present embodiment, each of the angle between incidence surface 21 and film formation surface 22 and the angle between film formation surface 22 and emission surface 23 is approximately 80 degrees.

It is to be noted that the enhancement angle (and the resonance angle in the close vicinity thereof) largely depends on the design of analysis chip 10. The design factors are the refractive index of prism 20, the refractive index of metal film 30, the film thickness of metal film 30, the extinction coefficient of metal film 30, the wavelength of excitation light α, and the like. While the enhancement angle and the resonance angle are shifted by the detection object substance fixed on metal film 30, the shift amount is smaller than several degrees. Here, the "resonance angle" is an incident angle at which the quantity of reflection light (not illustrated in the drawing) that is reflected by film formation surface 22 and emitted from emission surface 23 is minimized when the incident angle of excitation light α with respect to metal film 30 is scanned.

Prism 20 has a birefringence property to a certain degree. Examples of the material of prism 20 include a resin and glass. Examples of the resin of prism 20 include polymethylmethacrylate (PMMA), polycarbonate (PC), and cycloolefin polymer. Preferably, the material of prism 20 is a resin that has a refractive index of 1.4 to 1.6 and causes a small birefringence.

Metal film 30 is disposed on film formation surface 22 of prism 20. With this configuration, interaction (surface plasmon resonance) is caused between the photon of excitation light α incident on film formation surface 22 under the total reflection condition and the free electron in metal film 30, and thus localized-field light can be generated on the surface of metal film 30.

The material of metal film 30 is not limited as long as a surface plasmon resonance can be caused. Examples of the material of metal film 30 include gold, silver, copper, aluminum, and their alloys. In the present embodiment, metal film 30 is a thin film formed of gold. The formation method for metal film 30 is not limited. Examples of the formation method for metal film 30 include sputtering, deposition, and plating. Preferably, the thickness of metal film 30 is, but not limited to, 30 to 70 nm.

In addition, although not illustrated in FIG. 1, a capturing body for capturing a detection object substance is fixed on the surface of metal film 30 that faces away from prism 20 (the front surface of metal film 30). By fixing the capturing body, the detection object substance can be selectively detected. In the present embodiment, the capturing body is uniformly fixed in a predetermined region (reaction site) on metal film 30. The type of the capturing body is not limited as long as the detection object substance can be captured. In the present embodiment, the capturing body is an antibody that can be specifically coupled with the detection object substance or a fragment of the antibody. In the reaction site, reactions such as a coupling between the capturing body and the detection object substance (primary reaction), and fluorescent labeling of the detection object substance (secondary reaction) are performed.

Channel closure 40 is disposed on metal film 30. When metal film 30 is partly formed on film formation surface 22 of prism 20, channel closure 40 may be disposed on film formation surface 22. A channel groove is formed on the rear surface of channel closure 40. Together with metal film 30 (and prism 20), channel closure 40 forms channel 41 through which liquid flows. The capturing body fixed on metal film 30 is exposed to the interior of channel 41. Both ends of channel 41 are respectively connected to an inlet and an outlet, which are formed on the top surface of channel closure 40 and are not illustrated in the drawing. When liquid is injected into channel 41, the liquid makes contact with the capturing body.

Preferably, channel closure 40 is formed of a material that is transparent to light (fluorescence γ and plasmon scattering light δ) emitted from metal film 30. Examples of the material of channel closure 40 include a resin. Other parts of channel closure 40 may be formed of an opaque material as long as the material is transparent to the above-mentioned light. Channel closure 40 is joined to metal film 30 or prism 20 by bonding with a double-sided tape, an adhesive agent and the like, laser welding, ultrasound welding, pressure bonding with a clamp member and the like, for example.

The type of the liquid that flows through channel 41 is not limited. Examples of the liquid include a sample containing a detection object substance, a fluorescent labeling solution containing a fluorescence material, and a buffer solution. The types of the sample and the detection object substance are not limited. Examples of the sample include bodily fluids such as blood, serum, plasma, urine, nasal mucus, saliva, and semen, and their diluted solutions. Examples of the detection object substance include nucleic acid (such as DNA and RNA), protein (such as polypeptides and oligopeptides), amino acid, glucide, lipid and their modifier molecules.

As illustrated in FIG. 1, a large part of excitation light α enters prism 20 from incidence surface 21. At this time, a part of excitation light α is reflected by incidence surface 21 and becomes reflection light β. Excitation light α having entered prism 20 hits metal film 30 at a total reflection angle (an angle at which a surface plasmon resonance is caused). By irradiating metal film 30 with excitation light α at an angle that causes a surface plasmon resonance in the above-mentioned manner, localized light (also generally called "evanescent light" or "near-field light") can be generated on metal film 30. With this localized light, the fluorescence material labelling the detection object substance placed on metal film 30 is excited, and fluorescence γ is emitted. By detecting the quantity (intensity) of fluorescence γ emitted from the fluorescence material, SPFS device 100 detects the presence or the amount of the detection object substance. In addition, as elaborated later, SPFS apparatus 100 can acquire the position information of analysis chip 10 and the output information of excitation light irradiating unit 110 by detecting the quantity (intensity) of reflection light β.

Configuration of SPFS Apparatus

Next, the components of SPFS device 100 are described. As described above, SPFS apparatus 100 includes excitation light irradiating unit (excitation light irradiating section) 110, excitation light detecting unit (excitation light detecting section) 120, fluorescence detecting unit 130, liquid feeding unit 140, conveyance unit 150 and control processing section (processing section) 160.

Excitation light irradiating unit 110 applies excitation light α to analysis chip 10 held by chip holder 154. When detecting fluorescence γ, excitation light irradiating unit 110 emits only P wave with respect to metal film 30 toward incidence surface 21 such that the incident angle to metal film 30 is an angle at which a surface plasmon resonance is caused. Here, "excitation light" is light that directly or indirectly excites the fluorescence material. For example, excitation light α is light that generates localized light that excites the fluorescence material on the surface of metal film 30 when it is emitted to metal film 30 through prism 20 at an angle that causes a surface plasmon resonance. SPFS apparatus 100 according to the present embodiment uses excitation light α also for positioning of analysis chip 10 and for detection of abnormality in excitation light irradiating unit 110.

Excitation light irradiating unit 110 includes a configuration for emitting excitation light α toward prism 20, and a configuration for scanning the incident angle of excitation light α to the rear surface of metal film 30. In the present embodiment, excitation light irradiating unit 110 includes light source unit 111, angle adjusting mechanism 112 and light source controlling section 113.

Light source unit 111 emits collimated excitation light α having a constant wavelength and a constant quantity (intensity) such that the irradiation spot on the rear surface of metal film 30 has a substantially circular shape. Light source unit 111 includes, for example, a light source of excitation light α, a beam shaping optical system, and a temperature adjusting mechanism (not illustrated).

While the type of the light source is not limited, it is preferable that the light source be a high-power light source from the viewpoint of the use of a light detector that does not have high sensitivity such as a photodiode (PD) as second light receiving sensor 137. In the present embodiment, the light source is a laser diode (LD). Other examples of the light source include a light-emitting diode, a mercury lamp, and other laser light sources. In the case where the light emitted from the light source is not a beam, the light emitted from the light source is converted to a beam by a lens, a mirror, a slit and the like. In addition, in the case where the light emitted from the light source is not monochromatic light, the light emitted from the light source is converted to monochromatic light by a diffraction grid and the like. Further, in the case where the light emitted from the light source is not linear polarized light, the light emitted from the light source is converted to linear polarized light by a polarizer and the like.

The beam shaping optical system includes a collimator, a band pass filter, a linear polarization filter, a half-wave plate, a slit, a zooming unit and the like, for example. The beam shaping optical system may include one or more of the above-mentioned components.

The collimator collimates excitation light α emitted from the light source.

The band pass filter changes excitation light α emitted from the light source to narrowband light composed only of a central wavelength. The reason for this is that excitation light α from the light source has a slight wavelength distribution width.

The linear polarization filter changes excitation light α emitted from the light source to completely linearly polarized light. The half-wave plate adjusts the polarization direction of excitation light α such that the P wave component hits on metal film 30.

The slit and the zooming unit adjust the beam diameter, the outline shape and the like of excitation light α such that the shape of the irradiation spot on the rear surface of metal film 30 has a circular shape of a predetermined size.

The temperature adjusting mechanism is composed of a heater, a Peltier device, or the like, for example. The wavelength and the energy of the light emitted from the light source can vary depending on the temperature. Therefore, the temperature of the light source is maintained at a constant value by the temperature adjusting mechanism to control the wavelength and the energy of the light emitted from the light source at a constant value.

Angle adjusting mechanism 112 adjusts the incident angle of excitation light α to metal film 30 (the interface between prism 20 and metal film 30 (film formation surface 22)). Angle adjusting mechanism 112 relatively rotates the optical axis of excitation light α and chip holder 154 to emit excitation light α at a predetermined incident angle toward a predetermined position in metal film 30 through prism 20.

For example, angle adjusting mechanism 112 turns light source unit 111 around an axis (an axis perpendicular to the plane of FIG. 1) orthogonal to the optical axis of excitation light α. At this time, the position of the rotation axis is set such that the position of the irradiation spot on metal film 30 is not substantially moved when the incident angle is scanned. By setting the position of the rotation center at a position near the intersection of the optical axes of two rays of excitation light α at both ends of the scanning range of the incident angle (at a position between the irradiation position on film formation surface 22 and incidence surface 21), the shift of the irradiation position can be minimized.

As described above, the enhancement angle is an angle at which a maximum quantity of plasmon scattering light δ is obtained, among the incident angles of excitation light α with respect to metal film 30. By setting the incident angle of excitation light α to the enhancement angle or an angle approximately equal to the enhancement angle, fluorescence γ having a high intensity can be detected. While the basic incident condition of excitation light α is determined by the material and the shape of prism 20 of analysis chip 10, the film thickness of metal film 30, the refractive index of the liquid in the channel and the like, the optimum incident condition slightly varies depending on the type and the amount of the fluorescence material in the channel, shaping errors of prism 20 and the like. Therefore, it is preferable to determine the optimum enhancement angle in each measurement. In the present embodiment, the preferable emission angle of excitation light α to the normal of metal film 30 (straight line along the z-axis direction in FIG. 1) is approximately 70 degrees.

Light source controlling section 113 controls the components included in light source unit 111 to control the output of emission light (excitation light α) of light source unit 111. Light source controlling section 113 is composed of a publicly known computer, microcomputer, or the like including a computation device, a control device, a storage device, and an inputting device, for example.

Excitation light detecting unit 120 detects reflection light β generated by irradiation of analysis chip 10 with excitation light α for the purpose of the detection of abnormality in excitation light irradiating unit 110 and the positioning of analysis chip 10 at the time of optical measurement (for example, detection of the enhancement angle, measurement of the optical blank value, detection of fluorescence γ and the like).

Preferably, before the first optical measurement, excitation light detecting unit 120 detects reflection light β for the purpose of positioning of analysis chip 10 and the detection of abnormality in excitation light irradiating unit 110. In many cases, the first optical measurement is the detection of the enhancement angle, and it is therefore preferable to detect reflection light β before the detection of the enhancement angle. In the case where the detection of the enhancement angle is not performed, reflection light β is detected before the measurement of the optical blank value. In the case where the detection of the enhancement angle or the measurement of the optical blank value is not performed, reflection light β is detected before the detection of fluorescence γ.

The detection of reflection light β for detecting abnormality in excitation light irradiating unit 110, and the detection of reflection light β for positioning of analysis chip 10 may be simultaneously performed, or separately performed. In the present embodiment, the detection of reflection light β for detecting abnormality in excitation light irradiating unit 110 and the detection of reflection light β for positioning of analysis chip 10 are simultaneously performed.

Excitation light detecting unit 120 includes first light receiving sensor 121 and first sensor controlling section 122.

First light receiving sensor 121 detects reflection light β of excitation light α. The type of first light receiving sensor 121 is not limited as long as reflection light β of excitation light α can be detected. For example, first light receiving sensor 121 is a photodiode (PD), a position detection device (PSD), or the like. Preferably, the size of the light reception surface of first light receiving sensor 121 is greater than the beam diameter of excitation light α. For example, in the case where the beam diameter of excitation light α is approximately 1 mm to 1.5 mm, the length of each side of the light reception surface of first light receiving sensor 121 is preferably 3 mm or greater.

First light receiving sensor 121 is disposed at a position where reflection light β of excitation light α reaches. In the present embodiment, first light receiving sensor 121 is disposed at a position where reflection light β from incidence surface 21 reaches. Preferably, first light receiving sensor 121 is disposed at a position where reflection light β of excitation light α emitted at an angle equal to or approximately equal to the angle for the detection of fluorescence γ reaches. The irradiation position (irradiation direction) of excitation light α slightly varies depending on variation of the incident angle, and therefore, by setting the incident angle of excitation light α for the positioning of analysis chip 10 and the incident angle of excitation light α for the detection of fluorescence γ to values equal to or approximately equal to each other, the accuracy of the positioning in the detection of fluorescence γ can be enhanced. In the present embodiment, in the case where the emission angle of excitation light α to the normal of metal film 30 (straight line along the z-axis direction in FIG. 1) is approximately 70 degrees, reflection light β from incidence surface 21 advances in a direction approximately parallel to the travelling direction of the conveyance stage (x-axis direction in FIG. 1). Accordingly, first light receiving sensor 121 is disposed at a position where the reflection light β that travels in parallel reaches (see FIG. 4C).

First sensor controlling section 122 controls the detection of the output value of first light receiving sensor 121, the management of the sensitivity of first light receiving sensor 121 according to the detected output value, the changing of the sensitivity of first light receiving sensor 121 for acquiring an appropriate output value, and the like. First sensor controlling section 122 is composed of a publicly known computer, microcomputer, or the like including a computation device, a control device, a storage device, and an inputting device, for example.

Fluorescence detecting unit 130 detects fluorescence γ generated by irradiation of metal film 30 with excitation light α. In addition, as necessary, fluorescence detecting unit 130 also detects plasmon scattering light δ generated by irradiation of metal film 30 with excitation light α. Fluorescence detecting unit 130 includes light receiving unit 131, position switching mechanism 132 and second sensor controlling section 133, for example.

Light receiving unit 131 is disposed in the normal direction of metal film 30 of analysis chip 10 (the z-axis direction in FIG. 1). Light receiving unit 131 includes first lens 134, optical filter 135, second lens 136 and second light receiving sensor 137.

First lens 134 is, for example, a condenser lens, and condenses the light emitted from metal film 30. Second lens 136 is, for example, an image forming lens, and images the light condensed by first lens 134 on the light reception surface of second light receiving sensor 137. The light paths between the lenses are substantially parallel to each other.

Optical filter 135 is disposed between first lens 134 and second lens 136. When detecting fluorescence, optical filter 135 allows only the fluorescence component of the light incident on optical filter 135 to pass therethrough, while removing the excitation light component (plasmon scattering light δ). With this configuration, it is possible to guide only the fluorescence component to second light receiving sensor 137 to detect fluorescence γ with a high S/N ratio. Examples of the type of optical filter 135 include an excitation light reflection filter, a short wavelength cut filter and a band pass filter. Examples of optical filter 135 include a filter including a multi-layer film that reflects a predetermined light component and a color glass filter that absorbs a predetermined light component.

Second light receiving sensor 137 detects fluorescence γ and plasmon scattering light δ emitted from analysis chip 10. Examples of second light receiving sensor 137 include a photodiode (PD), a photomultiplier tube (PMT) and an avalanche photodiode (APD).

Position switching mechanism 132 switches the position of optical filter 135 between a position on the light path and a position outside the light path in light receiving unit 131. To be more specific, optical filter 135 is disposed on the light path of light receiving unit 131 when second light receiving sensor 137 detects fluorescence γ, and optical filter 135 is disposed at a position outside the light path of light receiving unit 131 when second light receiving sensor 137 detects plasmon scattering light δ. Position switching mechanism 132 is composed of a rotation driving section, and a publicly known mechanism (such as a turntable and a rack-and-pinion) that laterally moves optical filter 135 by utilizing a rotational movement, for example.

Second sensor controlling section 133 controls the detection of the output value of second light receiving sensor 137, the management of the sensitivity of second light receiving sensor 137 according to the detected output value, the changing of the sensitivity of second light receiving sensor 137 for acquiring an appropriate output value and the like. Second sensor controlling section 133 is composed of a publicly known computer, microcomputer, or the like including a computation device, a control device, a storage device, and an inputting device, for example.

Liquid feeding unit 140 supplies sample solution, labeling solution, washing solution and the like into channel 41 of analysis chip 10 held by chip holder 154. Liquid feeding unit 140 includes chemical liquid chip 141, syringe pump 142 and liquid feed pump driving mechanism 143.

Chemical liquid chip 141 is a vessel for housing liquid such as sample solution, labeling solution, and washing solution. Normally, as chemical liquid chip 141, a plurality of vessels corresponding to the types of the liquid are disposed, or a chip composed of a plurality of integrated vessels is disposed.

Syringe pump 142 is composed of syringe 144, and plunger 145 that can reciprocate in syringe 144. Through reciprocation of plunger 145, suction and discharge of the liquid is quantitatively performed. In the case where syringe 144 is replaceable, washing of syringe 144 is unnecessary. Such a configuration is preferable from the viewpoint of preventing entry of impurities. In the case where syringe 144 is not replaceable, it is possible to use syringe 144 without replacing syringe 144 by additionally providing a configuration for washing the interior of syringe 144.

Liquid feed pump driving mechanism 143 includes a device for driving plunger 145, and a device for moving syringe pump 142.

The driving device for syringe pump 142 is a device for reciprocating plunger 145, and includes a stepping motor, for example. A driving device including a stepping motor can manage the liquid feed amount of syringe pump 142 and the liquid feed speed, and is therefore preferable from the viewpoint of managing the amount of the residual liquid of analysis chip 10.

The device for moving syringe pump 142 freely moves syringe pump 142 in the axial direction (for example, a vertical direction) of syringe 144 and a direction (for example, a lateral direction) crossing the axial direction, for example. The device for moving syringe pump 142 is composed of a robot arm, a biaxial stage or a vertically movable turntable, for example.

Preferably, liquid feeding unit 140 further includes a device that detects the position of an end of syringe 144 from the viewpoint of adjusting the relative heights of syringe 144 and analysis chip 10 to constant values, and managing the amount of the residual liquid in analysis chip 10 at a constant value.

Liquid feeding unit 140 sucks various kinds of liquid from chemical liquid chip 141, and supplies the liquid into channel 41 of analysis chip 10. At this time, when plunger 145 is moved, the liquid reciprocates in channel 41 in analysis chip 10, thus agitating the liquid in channel 41. In this manner, the density of the liquid can be uniformized, and reaction (for example, antigen-antibody reaction) in channel 41 can be facilitated. From the view point of performing the above-mentioned operations, it is preferable that analysis chip 10 and syringe 144 be configured such that the inlet of analysis chip 10 is protected with a multi-layer film and that the inlet can be tightly sealed when syringe 144 penetrates the multi-layer film.

The liquid in channel 41 is again sucked by syringe pump 142, and ejected to chemical liquid chip 141 and the like. By repeating the above-mentioned operations, reaction, washing and the like of various kinds of liquid can be performed, and a detection object substance labeled with a fluorescence material can be placed at a reaction site in channel 41.

Conveyance unit 150 conveys analysis chip 10 to an installation position, a measurement position or a liquid feeding position, and fixes analysis chip 10. The "installation position" is a position for installing analysis chip 10 to SPFS apparatus 100 (i.e. chip holder 154). The "measurement position" is a position where fluorescence detecting unit 130 detects fluorescence γ that is generated when excitation light irradiating unit 110 applies excitation light α to analysis chip 10. In addition, the "liquid feeding position" is a position where liquid feeding unit 140 supplies liquid into channel 41 of analysis chip 10, or removes the liquid in channel 41 of analysis chip 10.

Conveyance unit 150 includes conveyance stage 152 and chip holder 154.

Conveyance stage 152 moves chip holder 154 in a specific direction (x-axis direction in FIG. 1) and a direction opposite to the specific direction. Conveyance stage 152 is driven by a stepping motor and the like, for example.

Chip holder 154 is fixed to conveyance stage 152 so as to detachably hold analysis chip 10. Chip holder 154 has a shape that can hold analysis chip 10 and does not block the light paths of excitation light α, reflection light β, fluorescence γ and the like. For example, chip holder 154 is provided with an opening through which these lights pass.

Control processing section 160 controls angle adjusting mechanism 112, light source controlling section 113, first sensor controlling section 122, position switching mechanism 132, second sensor controlling section 133, liquid feed pump driving mechanism 143 and conveyance stage 152. In addition, on the basis of the detection result of excitation light detecting unit 120, control processing section 160 acquires the position information of analysis chip 10 and the output information of excitation light irradiating unit 110. Then, on the basis of the acquired position information, control processing section 160 specifies the position of analysis chip 10 held by chip holder 154. In addition, in control processing section 160, preliminarily acquired output information that serves as a reference of excitation light irradiating unit 110 is stored. As elaborated later, control processing section 160 compares the acquired output information with the output information that serves as a reference to determine whether excitation light irradiating unit 110 is in a normal condition. The output information of excitation light irradiating unit 110 is information relating to the power of excitation light irradiating unit 110 and/or information relating to the irradiation direction of excitation light α. The output information that serves as a reference is the output information of excitation light irradiating unit 110 in a normal condition, and is, for example, excitation light irradiating unit 110 in the initial state. In the present embodiment, the output information of excitation light irradiating unit 110 is information relating to the power of excitation light irradiating unit 110. In addition, in the present embodiment, the output information that serves as a reference is the output information of excitation light irradiating unit 110 in the initial state. Control processing section 160 is composed of a publicly known computer, microcomputer, or the like including a computation device, a control device, a storage device, and an inputting device, for example.

Operation of SPFS Apparatus

Next, an operation of SPFS apparatus 100 (surface plasmon resonance fluorescence analysis method according to the present embodiment (also referred to simply as "analysis method")) is described. SPFS apparatus 100 according to the present embodiment can perform two operations described below, for example.

Procedure of First Operation

In the first operation, SPFS apparatus 100 acquires information relating to the power of excitation light irradiating unit 110 as the output information of excitation light irradiating unit 110. Then, when it is determined that the power of excitation light irradiating unit 110 is abnormal, SPFS apparatus 100 adjusts the power of excitation light irradiating unit 110.

Figure 2:
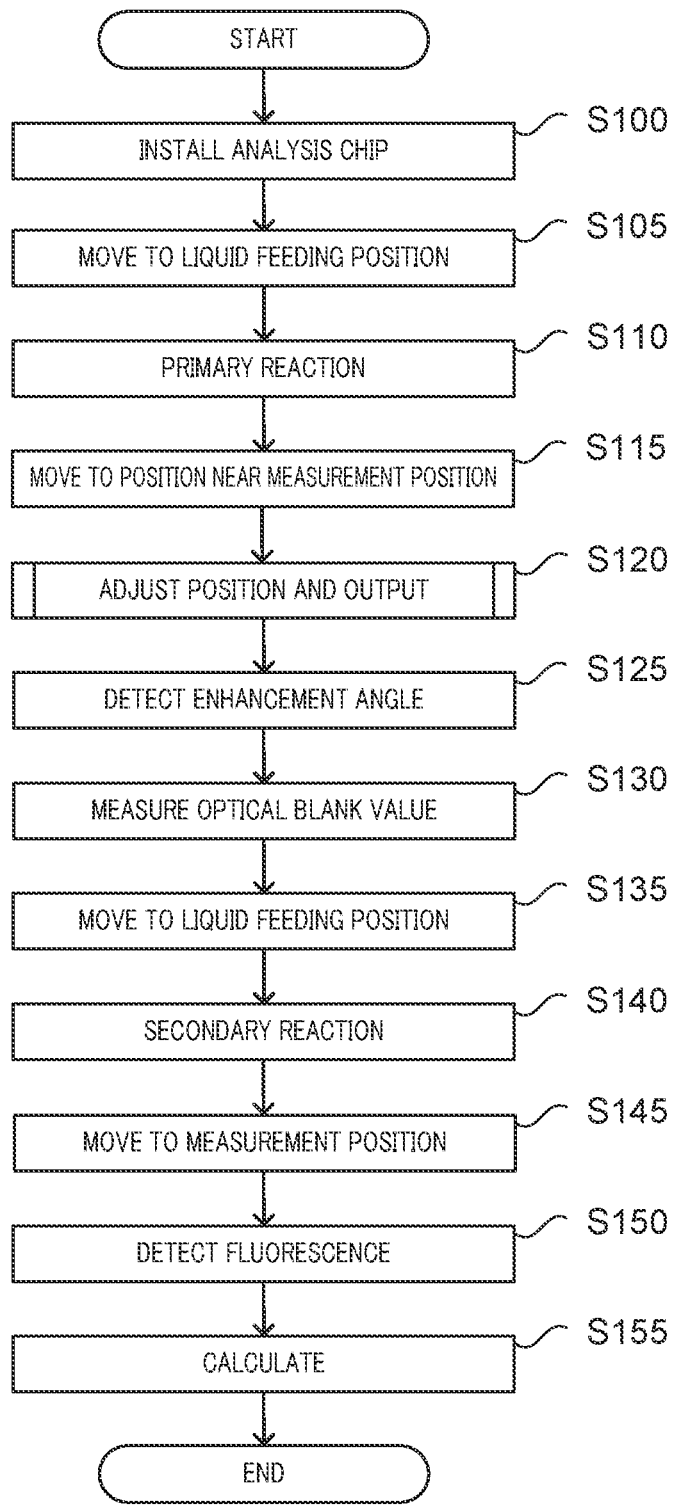
FIG. 2 is a flowchart of an exemplary procedure of a first operation of the SPFS apparatus according to Embodiment 1 of the present invention.
Figure 3:
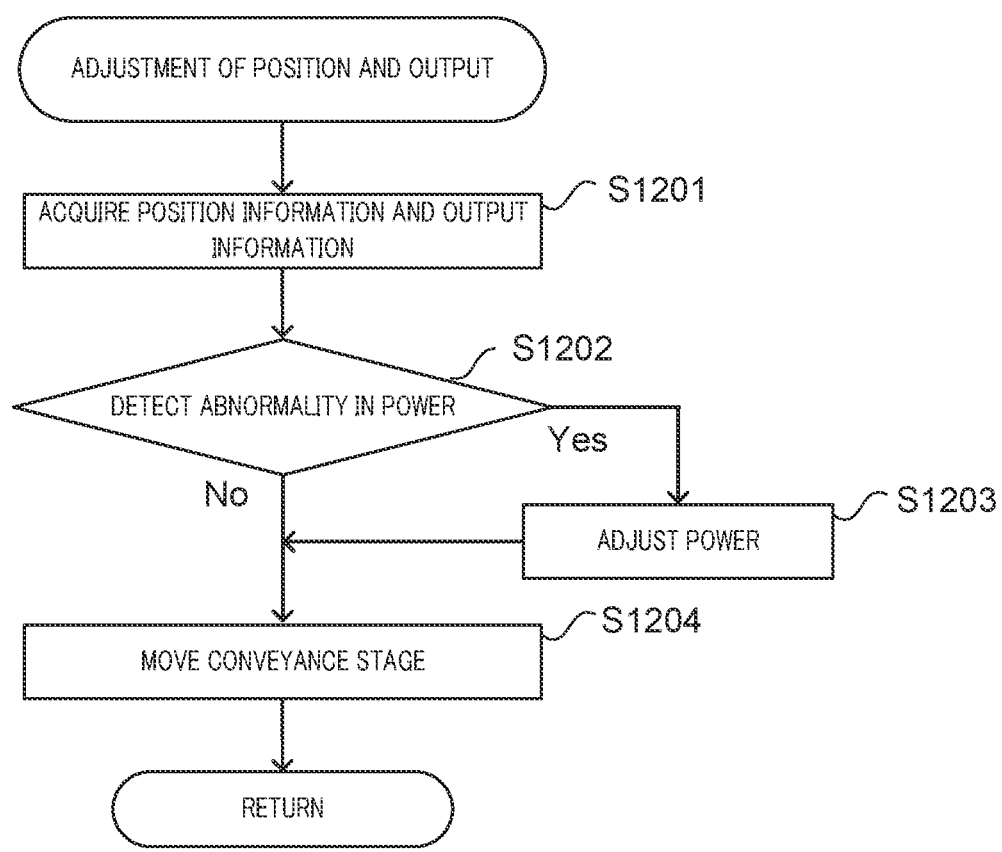
FIG. 3 is a flowchart of steps in a position adjustment step (step S120) illustrated in FIG. 2.

FIG. 2 is a flowchart of an exemplary procedure of a first operation of SPFS apparatus 100. FIG. 3 is a flowchart of steps in a step of adjusting the position and the output (step S120) illustrated in FIG. 2. In the first operation, an abnormality detection step (step S1202) is included in the step of adjusting the position and the output (step S120).

First, analysis chip 10 is installed at an installation position of SPFS apparatus 100 (step S100). To be more specific, analysis chip 10 is installed in chip holder 154 of SPFS apparatus 100.

Next, control processing section 160 operates conveyance stage 152 to move analysis chip 10 to a liquid feeding position (step S105).

Next, control processing section 160 operates liquid feeding unit 140 to introduce the sample solution in chemical liquid chip 141 into channel 41 of analysis chip 10 (step S110). In channel 41, the detection object substance is captured on metal film 30 by an antigen-antibody reaction (primary reaction). Thereafter, the sample solution in channel 41 is removed, and the interior of channel 41 is washed with the washing solution. It is to be noted that when moisturizing agent is present in channel 41 of analysis chip 10, the interior of channel 41 is washed prior to the introduction of the sample solution to remove the moisturizing agent so that the capturing body can properly capture the detection object substance.

Next, control processing section 160 operates conveyance stage 152 to move analysis chip 10 to a position near the measurement position (step S115).

Next, control processing section 160 operates excitation light irradiating unit 110, excitation light detecting unit 120 and conveyance stage 152 to acquire the position information of analysis chip 10 and the output information of excitation light irradiating unit 110. Control processing section 160 adjusts the position of analysis chip 10 on the basis of the acquired position information. In addition, control processing section 160 determines whether excitation light irradiating unit 110 is in a normal condition on the basis of the acquired output information. Then, when it is determined that the power of excitation light irradiating unit 110 is abnormal, control processing section 160 adjusts the power of excitation light irradiating unit 110 on the basis of the acquired output information (step S120).

As illustrated in FIG. 3, in this step, first, analysis chip 10 held by chip holder 154 is irradiated with excitation light α, and reflection light β of excitation light α reflected by the surface of analysis chip 10 is detected, thereby acquiring the position information of analysis chip 10 and the output information of excitation light irradiating unit 110 (information relating to the power) (step S1201).

Next, on the basis of the output information, control processing section 160 determines whether the power of excitation light irradiating unit 110 (i.e. light source unit 111) is normal (step S1202). In control processing section 160, information relating to the power of excitation light irradiating unit 110 of the initial state is stored. To be more specific, in control processing section 160, the intensity of reflection light β, from the surface of analysis chip 10, of excitation light α emitted from excitation light irradiating unit 110 of the initial state (hereinafter referred to as simply as "initial value") is stored. Control processing section 160 compares the detection value of reflection light β detected in step S121 with the initial value preliminarily stored in control processing section 160 to determine whether the power of excitation light irradiating unit 110 is normal. For example, the difference between the initial value and the detection value is greater than a predetermined reference value (threshold), control processing section 160 determines that the power of excitation light irradiating unit 110 is abnormal. The reference value (threshold) is appropriately set in accordance with the accuracy required for the analysis.

When it is determined that the power of excitation light irradiating unit 110 is lowered (abnormal), control processing section 160 adjusts the output of excitation light irradiating unit 110 to a desired power (step S1203). When it is determined that the power of excitation light irradiating unit 110 is normal, control processing section 160 continues the subsequent operations.

Next, on the basis of the position information of analysis chip 10, control processing section 160 adjusts the position of analysis chip 10 (step S1204). As elaborated later, control processing section 160 can specify the degree of the positional displacement of analysis chip 10 from the measurement position on the basis of the position information. On the basis of the acquired position information, control processing section 160 operates conveyance stage 152 to move chip holder 154, and dispose analysis chip 10 at an appropriate measurement position.

Figure 4A:
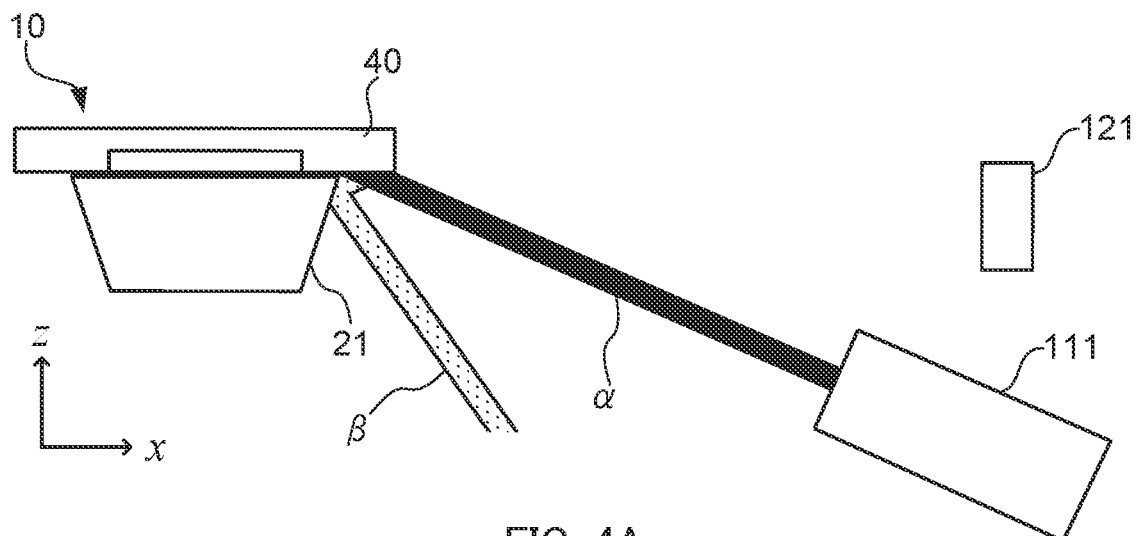
FIGS. 4A to 4C are schematic views for describing a step of acquiring position information of an analysis chip and output information of an excitation light irradiating unit (step S1201)
Figure 4B:
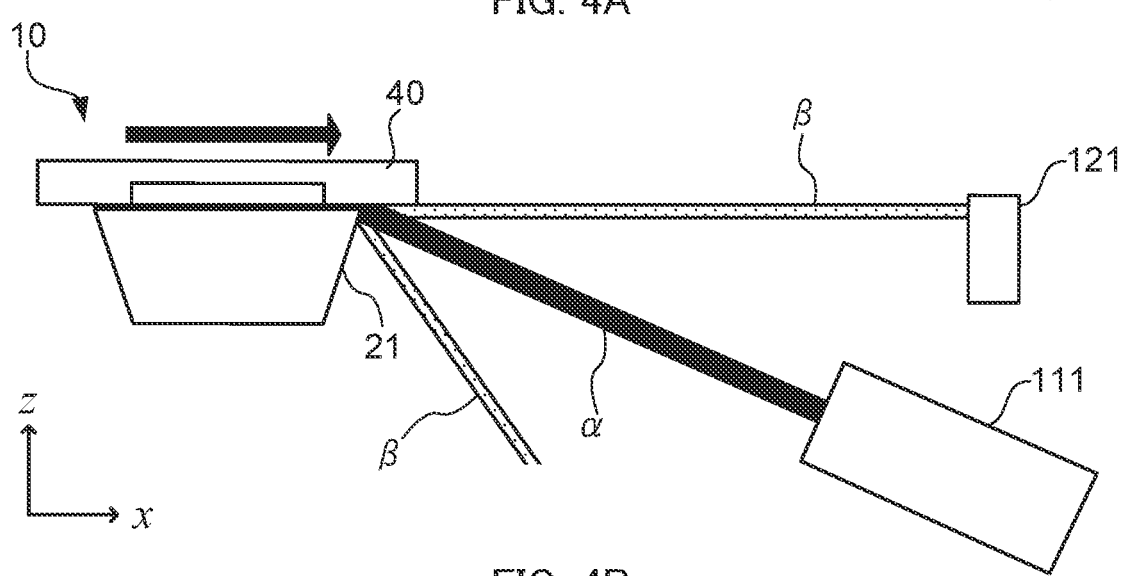

FIGS. 4A and 4B are schematic views for describing a step of acquiring the position information of analysis chip 10 and the output information of excitation light irradiating unit 110 (step S1201). First, as illustrated in FIG. 4A, in the case where analysis chip 10 is located at a position remote from light source unit 111, when light source unit 111 emits excitation light α, the excitation light α is reflected by channel closure 40 and travels toward the lower side (conveyance stage 152 side). Thus, reflection light β from the surface of analysis chip 10 is not incident on first light receiving sensor 121 of excitation light detecting unit 120.

When analysis chip 10 is brought closer to light source unit 111 from the above-mentioned state, then excitation light α from light source unit 111 reaches the boundary (hereinafter referred to as "edge") between prism 20 and channel closure 40. In this case, as illustrated in FIG. 4B, while excitation light α (reflection light β) reflected by channel closure 40 does not enter first light receiving sensor 121, excitation light α (reflection light β) reflected by incidence surface 21 enters first light receiving sensor 121. Thus, a part of reflection light β from analysis chip 10 enters first light receiving sensor 121.

Figure 4C:
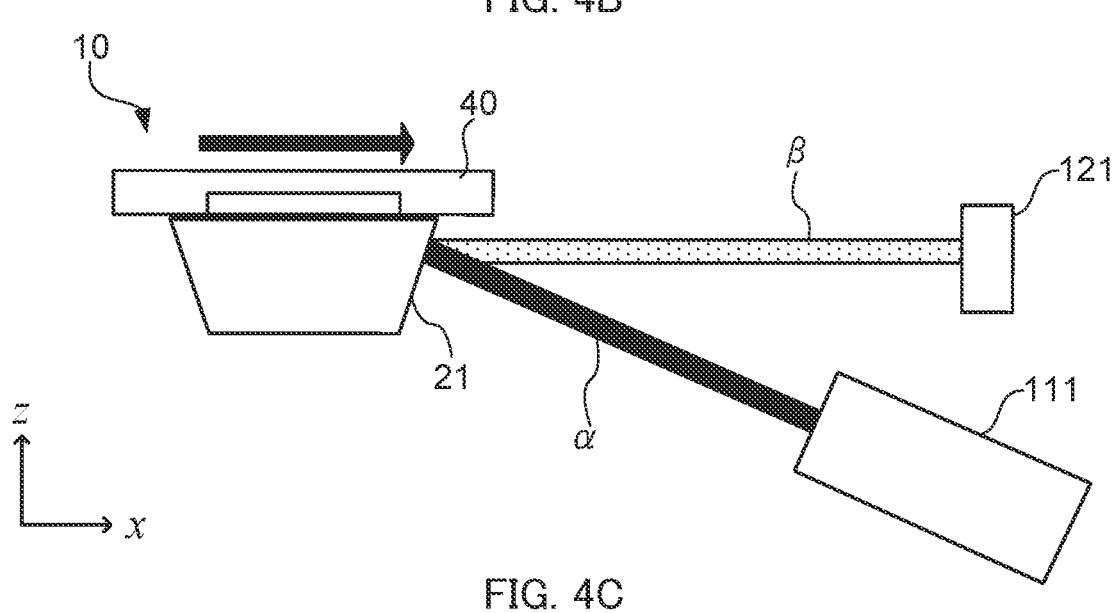

When analysis chip 10 is further brought close to light source unit 111, the entirety of excitation light α from light source unit 111 reaches incidence surface 21 of prism 20. Thus, as illustrated in FIG. 4C, the entirety of reflection light β from the surface of analysis chip 10 enters first light receiving sensor 121.

Figure 5A:
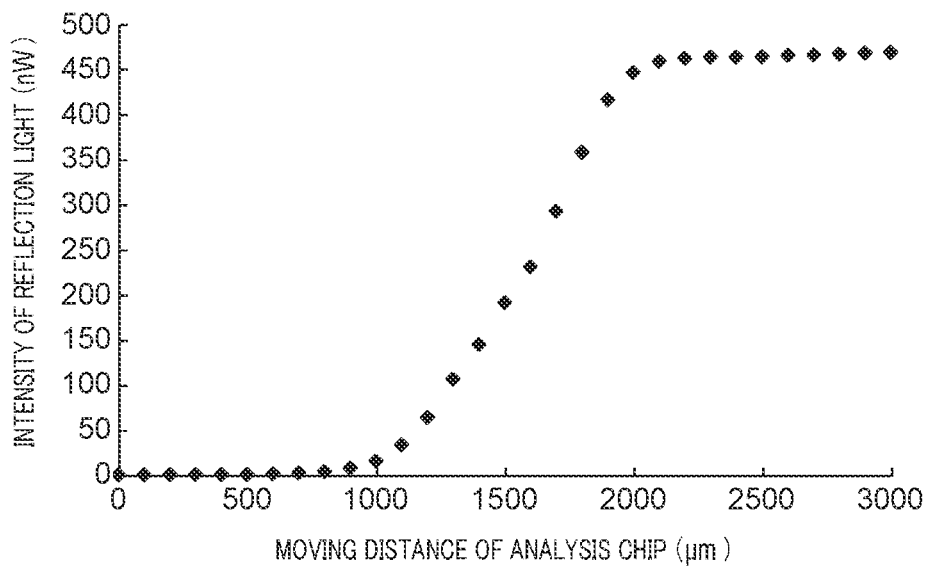
FIGS. 5A and 5B are graphs showing exemplary detection results of reflection light by a first light receiving sensor.
Figure 5B:
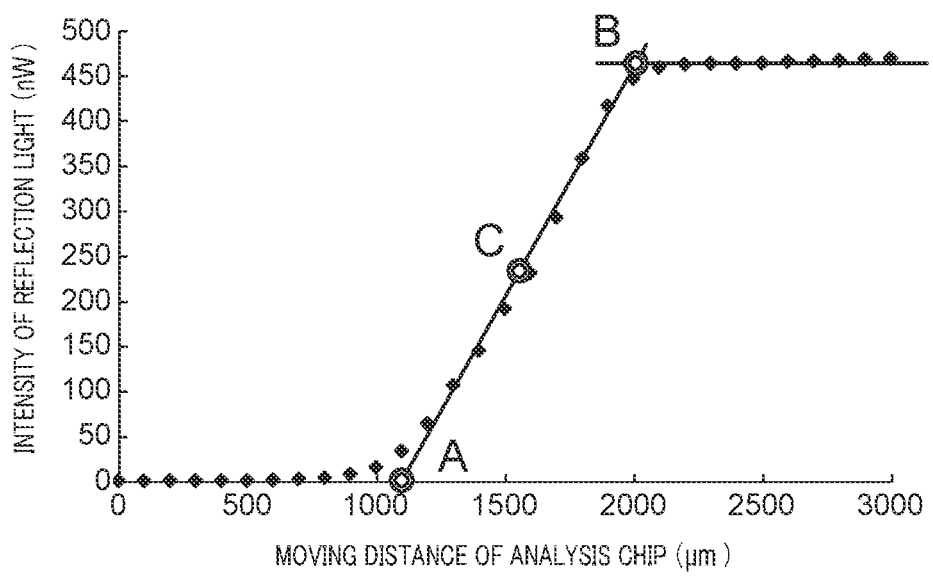

FIGS. 5A and 5B are graphs showing examples of detection results of reflection light β by first light receiving sensor 121. In this examples, the intensity of reflection light β was measured with first light receiving sensor 121 while moving analysis chip 10 by conveyance stage 152 in one direction (x-axis direction) in units of 100 μm. The beam diameter of excitation light α is approximately 1 to 1.5 mm. FIG. 5A shows only detection results, and FIG. 5B shows also three approximation lines.

As illustrated in FIG. 5A, when the moving distance of analysis chip 10 is 0 to approximately 1,000 μm, reflection light β from the surface of analysis chip 10 is not incident on first light receiving sensor 121. The reason for this is that excitation light α is reflected by channel closure 40 and travels toward the lower side (conveyance stage 152 side) (see FIG. 4A). On the other hand, when the moving distance of analysis chip 10 is approximately 1,000 μm to approximately 2,000 μm, the intensity of reflection light β incident on first light receiving sensor 121 gradually increases. The reason for this is that a part of excitation light α is reflected by incidence surface 21, and enters first light receiving sensor 121 (see FIG. 4B). When the moving distance of analysis chip 10 is greater than approximately 2,000 μm, the intensity of reflection light β incident on first light receiving sensor 121 is almost constant and maximized. The reason for this is that the entirety of reflection light β enters first light receiving sensor 121 (see FIG. 4C). Accordingly, the inclined part (moving distance: approximately 1,000 μm to approximately 2,000 μm) in the graph corresponds to the edge. It is to be noted that the width of the inclined part corresponds to the beam diameter (approximately 1 mm to approximately 1.5 mm) of excitation light α in the x-axis direction.

In FIG. 5B, the horizontal part in the former half (moving distance: 0 to approximately 1,000 μm), the inclined part (moving distance: approximately 1,000 μm to approximately 2,000 μm), and the horizontal part in the latter half (moving distance: greater than approximately 2,000 μm) are each approximated by a straight line. In the graph, point A is the intersection of the approximation straight line of the horizontal part in the former half and the approximation straight line of the inclined part. Point B is the intersection of the approximation straight line of the inclined part and the approximation straight line of the horizontal part in the latter half. Point C is the middle point between point A and point B. Point A corresponds to a minimum value of the intensity of reflection light β. Point B corresponds to a maximum value of the intensity of reflection light β. Point C corresponds to an intermediate value of the intensity of reflection light β.

In the graph of FIG. 5B, points A to C may be used to specify the position of analysis chip 10. Point A and point B indicate points where the end of the beam of excitation light α reaches the edge. Accordingly, the position of the edge can be specified by considering the beam diameter of excitation light α, and as a result, the position of analysis chip 10 can be specified. On the other hand, point C indicates a point where the center of the beam of excitation light α reaches the edge. When point C is utilized, the position of the edge can be specified without considering the beam diameter of excitation light α, and as a result, the position of analysis chip 10 can be specified. Accordingly, from the viewpoint of suppressing the influence of the beam diameter of excitation light α, it is preferable to use the intermediate value of the intensity of reflection light β of excitation light α for specifying the position of analysis chip 10.

In addition, point B may be used to acquire information relating to the power of excitation light irradiating unit 110. Point B is a maximum value of the intensity of reflection light β of excitation light α emitted from excitation light irradiating unit 110, and is an output value of excitation light α emitted from irradiation light irradiating unit 110. Accordingly, by comparing the initial value and the maximum value of the intensity of reflection light β, whether the power of excitation light irradiating unit 110 (light source unit 111) is lowered can be determined.

Figure 6A:
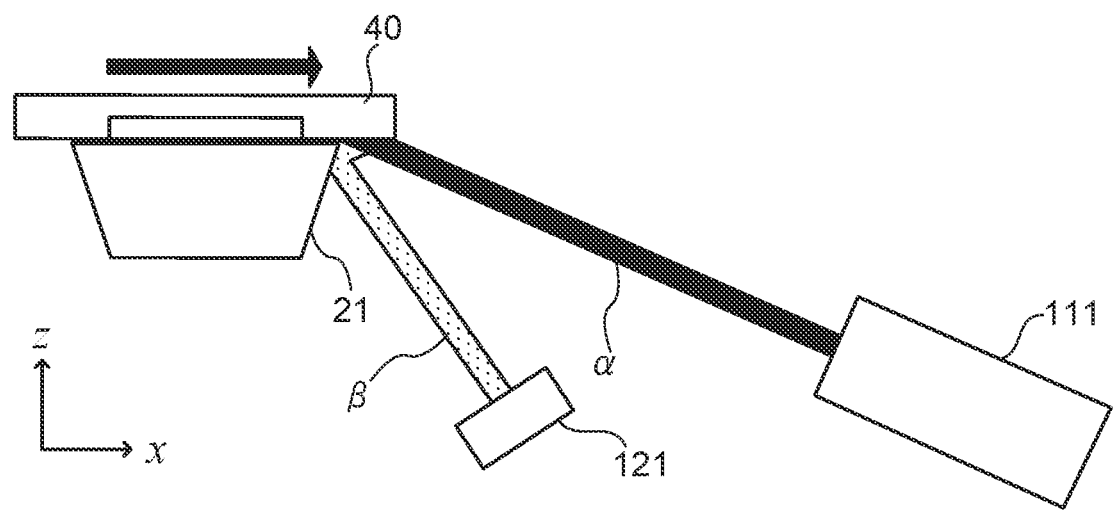
FIGS. 6A and 6B are schematic views for describing a modification of the step of acquiring the position information of the analysis chip and the output information of the excitation light irradiating unit (step S1201)

In addition, as described above, the position of analysis chip 10 can be specified by irradiating analysis chip 10 with excitation light α, and detecting reflection light β of excitation light α reflected by the surface of analysis chip 10. However, from the viewpoint of specifying the position of analysis chip 10 not only in the lateral direction (x-axis direction) but also in the height direction (z-axis direction) with high accuracy, it is preferable to irradiate adjacent two surfaces of analysis chip 10 with excitation light α to specify the position of analysis chip 10 as illustrated in FIGS. 4A to 4C. In this case, it is preferable to emit excitation light α in a direction that is neither parallel nor perpendicular to the moving direction of chip holder 154 moved by conveyance stage 152. It is to be noted that, also when first light receiving sensor 121 is disposed at a position where reflection light β from channel closure 40 reached but reflection light β from incidence surface 2 does not reach as illustrated in FIG. 6A, an effect similar to those of the exemplary cases illustrated in FIGS. 4A to 4C is achieved (the intensity of reflection light β is high when the moving distance is short, and the intensity of reflection light β is low when the moving distance is long).

Figure 6B:
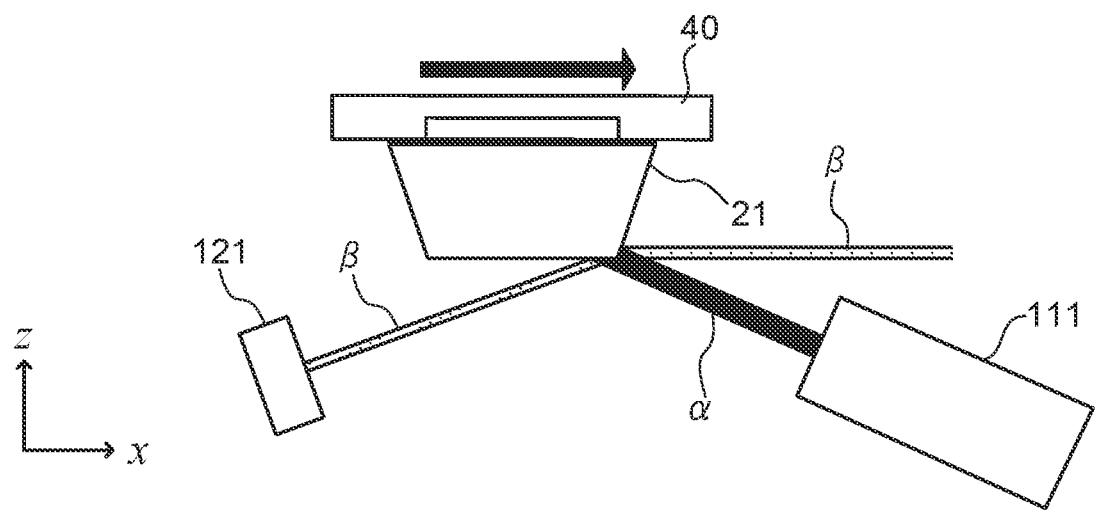

In addition, since the position of incidence surface 21 is an important factor, it is preferable to irradiate incidence surface 21 and a surface adjacent to incidence surface 21 (in the present embodiment, the rear surface of channel closure 40) of analysis chip 10 with excitation light α when two adjacent surfaces of analysis chip 10 are irradiated with excitation light α. Then, incidence surface 21 of prism 20 and the bottom surface of prism 20 may be irradiated with excitation light α as illustrated in FIG. 6B. In the example illustrated in FIG. 6B, however, analysis chip 10 is closer to light source unit 111 relative to the measurement position at the time of specifying the position of analysis chip 10 (step S120). Consequently, chip holder 154 is required to be moved in an opposite direction by conveyance stage 152 when moving analysis chip 10 to the measurement position (step S142). This operation of conveyance stage 152 in two directions might lead to reduction in operation accuracy in comparison with the case where conveyance stage 152 is operated in only one direction. In contrast, chip holder 154 is not required to be moved in opposite directions by conveyance stage 152 in the exemplary cases illustrated in FIGS. 4A to 4C and FIG. 6A. Accordingly, from the viewpoint of adjusting the position of analysis chip 10 with high accuracy, it is preferable to move chip holder 154 by conveyance stage 152 only in a direction (x-axis direction) toward the light source of excitation light α (light source unit 111) in the step of acquiring the position information of analysis chip 10 (step S1201) and the step of moving the analysis chip to the measurement position (step S1204).

Figure 7:
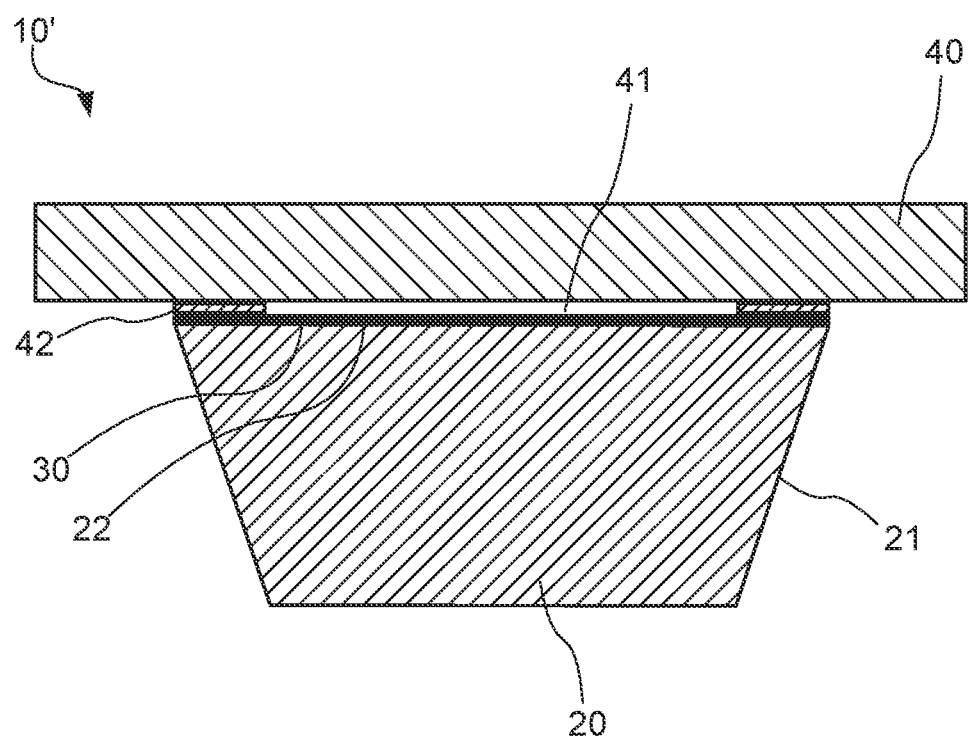
FIG. 7 is a sectional view illustrating another exemplary analysis chip.

It is to be noted that the "two adjacent surfaces of analysis chip 10" include two substantially adjacent surfaces. For example, a case is assumed in which analysis chip 10' including prism 20, metal film 30 disposed on film formation surface 22 of the prism, spacer 42 disposed on metal film 30, and channel closure 40 disposed on spacer 42 is used as illustrated in FIG. 7. Here, the shape of channel 41 is defined by spacer 42, and channel closure 40 is a transparent flat plate. Strictly speaking, in this case, since the side surface of spacer 42 extends between incidence surface 21 of prism 20 and the bottom surface of channel closure 40, incidence surface 21 and the bottom surface of channel closure 40 are not adjacent to each other. However, in the case where the thickness of spacer 42 is much smaller (for example, 100 μm) than the beam diameter (for example, 1 mm to 1.5 mm) of excitation light α, incidence surface 21 and the bottom surface of channel closure 40 can be considered to be substantially adjacent to each other. Accordingly, in this case, reflection light β from incidence surface 21 and the bottom surface of channel closure 40 that are substantially adjacent to each other is detected to detect the edge. Likewise, joining members such as adhesive agent and a double-sided tape, metal film 30, and the like are also negligible.

The thickness of the above-mentioned members (for example, spacer 42) that are negligible in detection of reflection light β is equal to or smaller than 1/5 of the beam diameter of excitation light α, preferably, equal to or smaller than 1/10 of the beam diameter of excitation light α. For example, when excitation light α is applied to a region including spacer 42 whose thickness is equal to or smaller than 1/5, or, equal to or smaller than 1/10, of the beam diameter of excitation light α, the most part of (4/5 or more, or 9/10 or more) of reflection light β from the surface of analysis chip 10' is reflection light β from incidence surface 21 or the bottom surface of channel closure 40, and is utilized for the position detection. Accordingly, the position of analysis chip 10' can be specified without being influenced by spacer 42. In this manner, a member (such as spacer 42, a joining member and metal film 30) whose thickness is equal to or smaller than 1/5 of the beam diameter of excitation light α is negligible in detection of reflection light β. That is, incidence surface 21 and the bottom surface of channel closure 40 of analysis chip 10' can be regarded as two substantially adjacent surfaces.

Figure 8A:
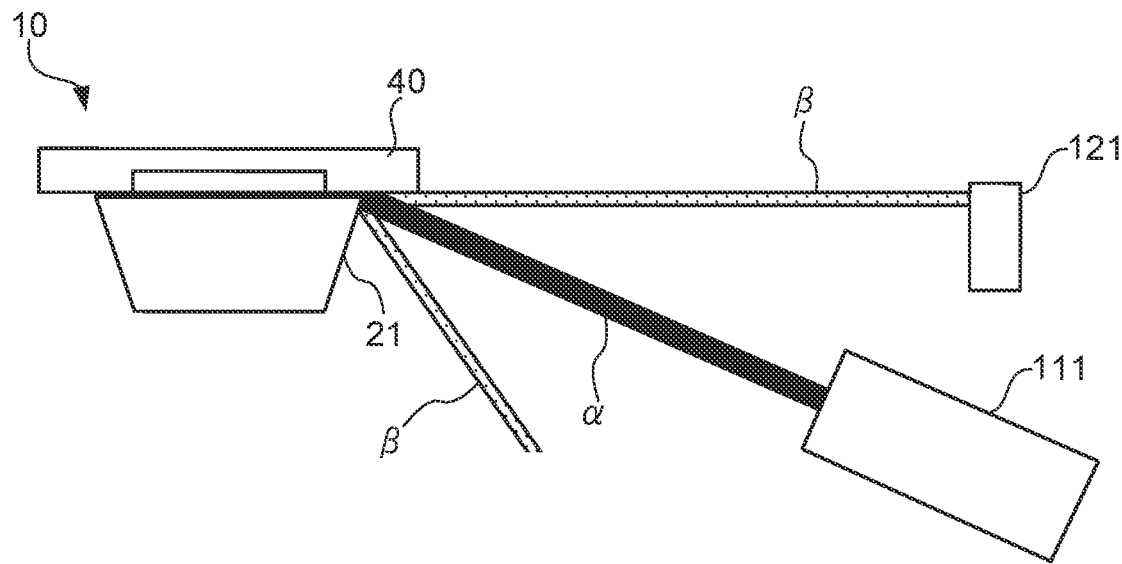
FIGS. 8A and 8B are schematic views for describing a step of disposing the analysis chip at a measurement position (step S1204)
Figure 8B:
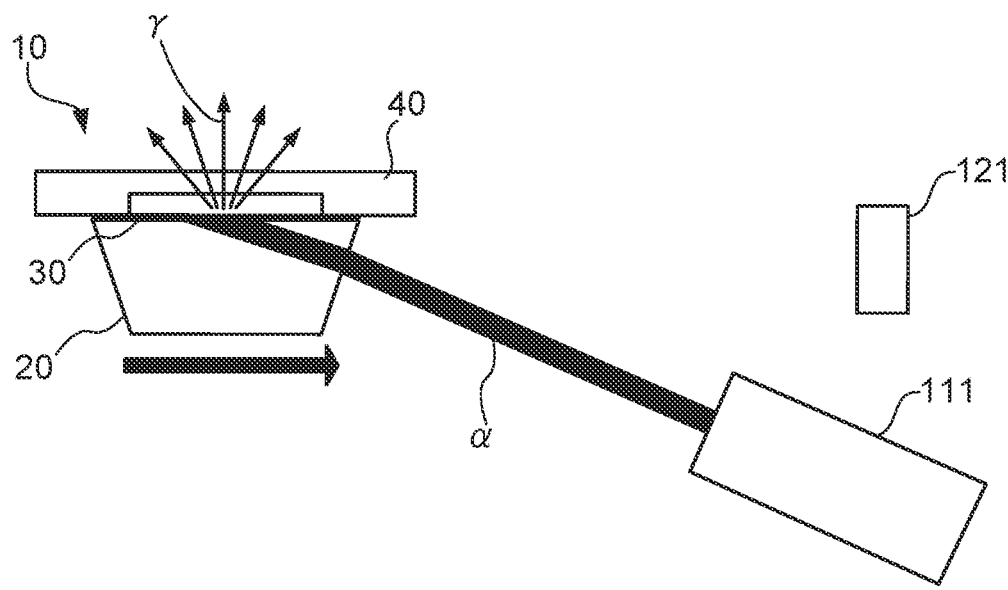

FIGS. 8A and 8B are schematic views for describing a step (step S1204) of disposing analysis chip 10 to an appropriate measurement position. First, it is assumed that the position of the edge is specified as illustrated in FIG. 8A. In this case, the distance between the position of the edge and the region to which excitation light α should be applied in the rear surface of metal film 30 (the region on the rear side of the reaction site) is determined. Accordingly, as illustrated in FIG. 8B, by controlling conveyance stage 152 to move chip holder 154 by a predetermined distance, analysis chip 10 can be disposed at an appropriate measurement position.

Figure 9A:
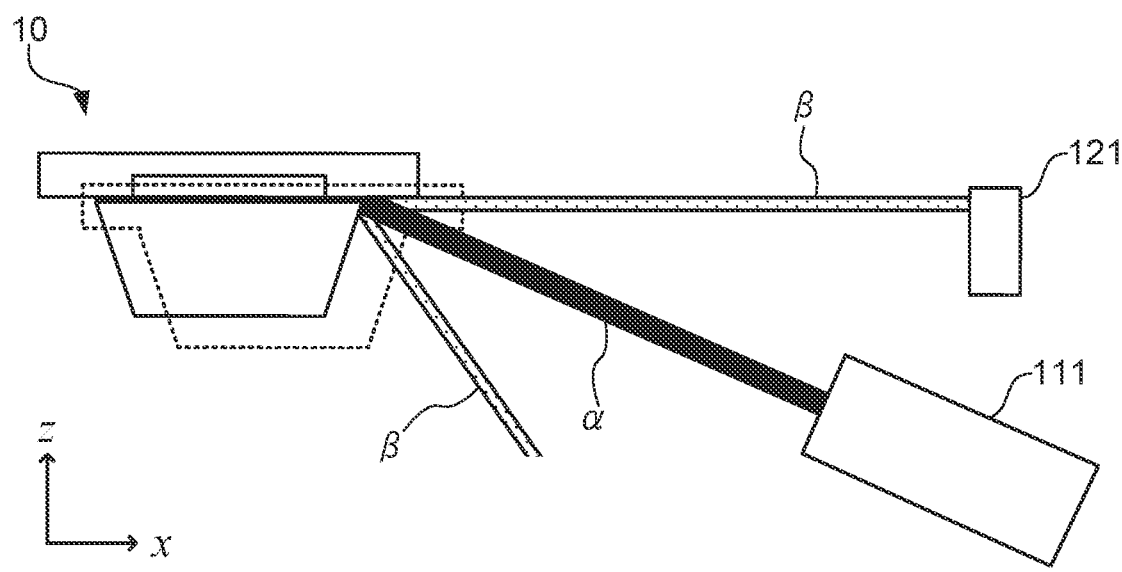
FIGS. 9A and 9B are schematic views for describing the step of disposing the analysis chip at the measurement position (step S1204)
Figure 9B:
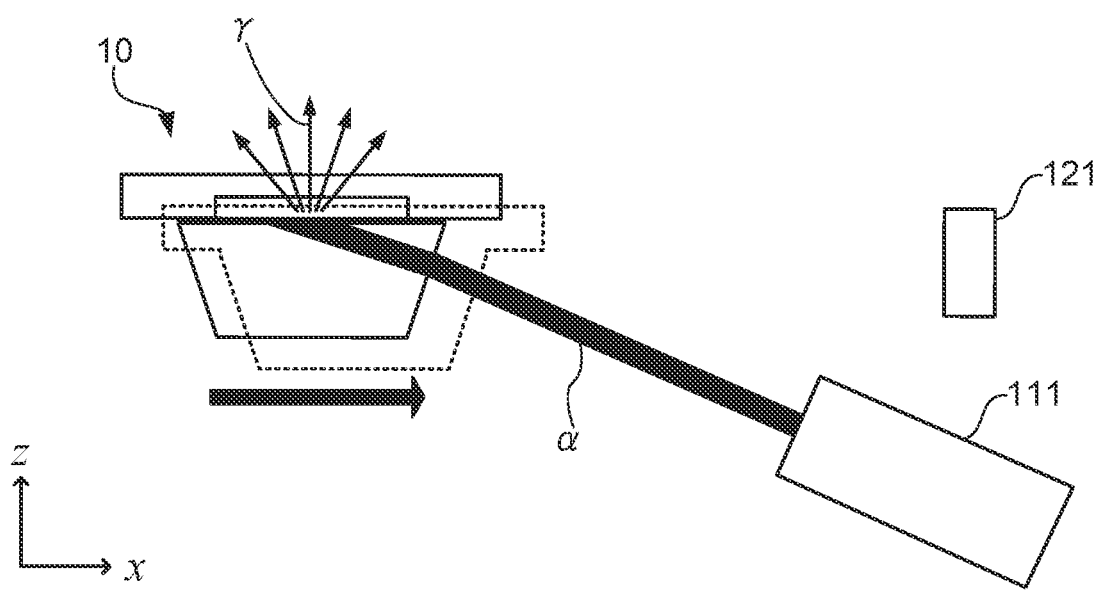

In addition, as illustrated in FIGS. 9A and 9B, even when analysis chip 10 is disposed at a position shifted in a height direction (z-axis direction) (for example, when a foreign matter is sandwiched between analysis chip 10 and chip holder 154), analysis chip 10 can be disposed at an appropriate measurement position. Specifically, a case is assumed in which the position of the edge is specified as illustrated in FIG. 9A. In this case, the position of analysis chip 10 is shifted in the x-axis direction in comparison with the case (indicated with the broken line in the drawing) where analysis chip 10 is not shifted in the z-axis direction. Even in this case, however, as illustrated in FIG. 9B, analysis chip 10 can be disposed at an appropriate measurement position by moving chip holder 154 by a predetermined distance by conveyance stage 152 on the basis of the position of the edge.

Now the description is returned to the procedure of the operation of SPFS device 100 (see FIG. 2). Next, control processing section 160 operates excitation light irradiating unit 110 and fluorescence detecting unit 130 to irradiate analysis chip 10 disposed at an appropriate measurement position with excitation light α, and detects plasmon scattering light δ whose wavelength is identical to that of excitation light α, thereby detecting the enhancement angle (step S125). To be more specific, control processing section 160 operates excitation light irradiating unit 110 to scan the incident angle of excitation light α to metal film 30, while operating fluorescence detecting unit 130 to detect plasmon scattering light δ. At this time, control processing section 160 operates position switching mechanism 132 to dispose optical filter 135 at a position outside the light path of light receiving unit 131. Then, control processing section 160 determines, to be the enhancement angle, the incident angle of excitation light α at which the quantity of the plasmon scattering light δ is maximized.

Next, control processing section 160 operates excitation light irradiating unit 110 and fluorescence detecting unit 130 to irradiate analysis chip 10 disposed at an appropriate measurement position with excitation light α, and records an output value (optical blank value) of second light receiving sensor 137 (step S130). At this time, control processing section 160 operates angle adjusting mechanism 112 to set the incident angle of excitation light α to the enhancement angle. In addition, control processing section 160 controls position switching mechanism 132 to dispose optical filter 135 at a position on the light path of light receiving unit 131.

Next, control processing section 160 operates conveyance stage 152 to move analysis chip 10 to a liquid feeding position (step S135).

Next, control processing section 160 operates liquid feeding unit 140 to introduce liquid (labeling solution) containing a secondary antibody labeled with a fluorescence material into channel 41 of analysis chip 10 (step S140). In channel 41, by an antigen-antibody reaction (secondary reaction), a detection object substance captured on metal film 30 is labeled with the fluorescence material. Thereafter, the labeling solution in channel 41 is removed, and the interior of the channel is washed with washing solution.

Next, control processing section 160 operates conveyance stage 152 to move analysis chip 10 to an appropriate measurement position determined in step S120 (step S145).

Next, control processing section 160 operates excitation light irradiating unit 110 and fluorescence detecting unit 130 to irradiate analysis chip 10 disposed at an appropriate measurement position with excitation light α, and detects fluorescence γ emitted from the fluorescence material labelling the detection object substance captured by the capturing body (step S150).

Finally, control processing section 160 subtracts the optical blank value from the detection value of fluorescence γ to calculate the intensity of the fluorescence correlating with the amount of the detection object substance (step S155). The intensity of the calculated fluorescence is converted to the amount, the concentration, and the like of the detection object substance as necessary.

Through the above-mentioned procedure, the presence or the amount of the detection object substance in the sample solution can be detected.

Procedure of Second Operation

Also in the second operation, SPFS apparatus 100 acquires information relating to the power of excitation light irradiating unit 110 as the output information of excitation light irradiating unit 110. In the second operation, when it is determined that the power of excitation light irradiating unit 110 is abnormal, SPFS apparatus 100 corrects the detection value of fluorescence γ in accordance with the value of the power of excitation light irradiating unit 110.

Figure 10:
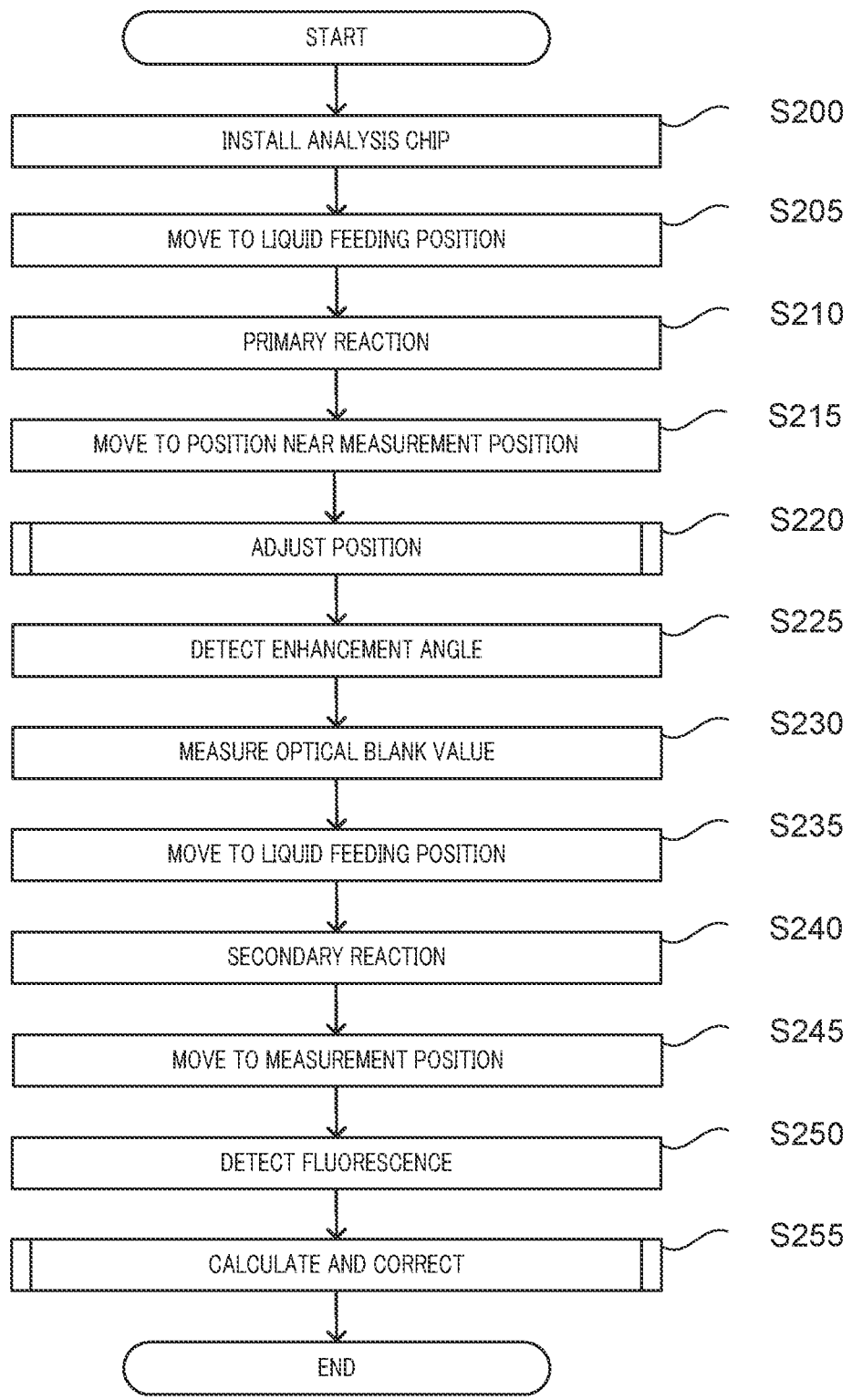
FIG. 10 is a flowchart of an exemplary procedure of a second operation of the SPFS apparatus according to Embodiment 1 of the present invention.
Figure 11A:
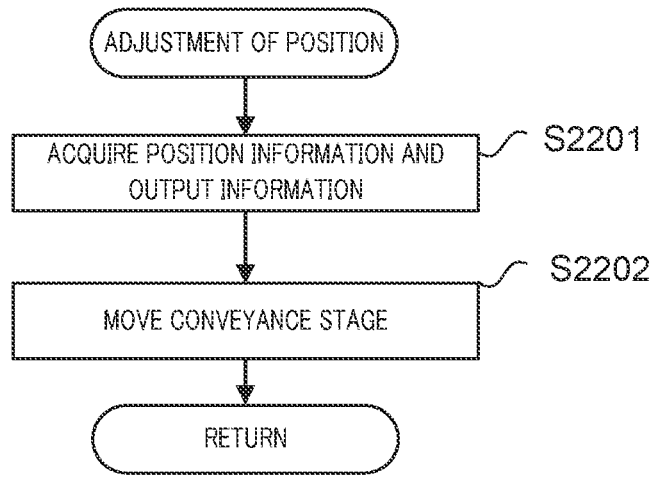
FIG. 11A is a flowchart of steps in a position adjustment step (step S220) illustrated in FIG. 10.
Figure 11B:
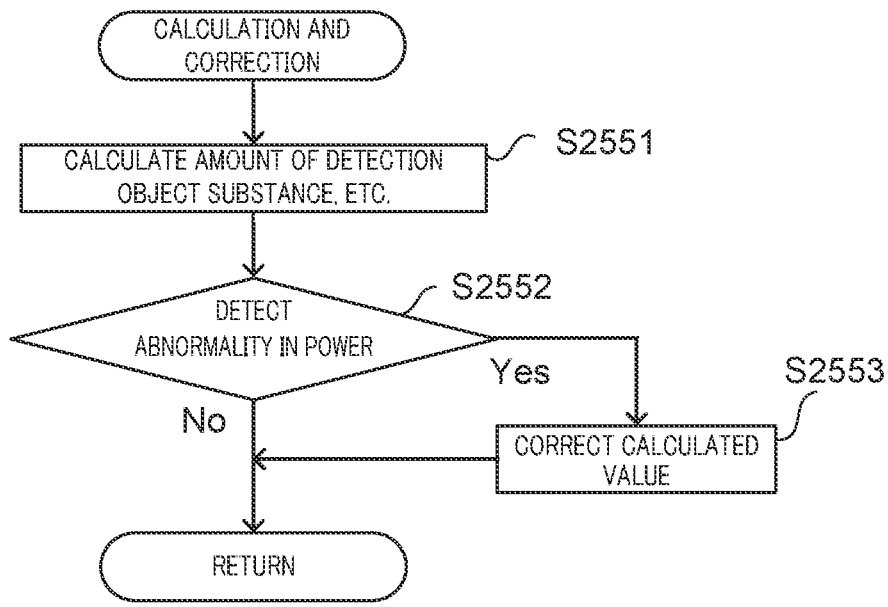
FIG. 11B is a flowchart of steps in a calculation and correction step (step S255) illustrated in FIG. 10.

FIG. 10 is a flowchart of an exemplary procedure of the second operation of SPFS apparatus 100. FIG. 11A is a flowchart of steps in the position adjustment step (step S220) illustrated in FIG. 10, and FIG. 11B is a flowchart of steps in the step of calculating the fluorescence intensity correlating with the amount of the detection object substance (step S255) illustrated in FIG. 10. In the procedure of the second operation, an abnormality detection step (step S2552) is included in the step of calculating the amount of the detection object substance and the like (step S255).

First, analysis chip 10 is installed at an installation position of SPFS apparatus 100 (step S200). To be more specific, analysis chip 10 is installed in chip holder 154 of SPFS apparatus 100.

Next, control processing section 160 operates conveyance stage 152 to move analysis chip 10 to a liquid feeding position (step S205).

Next, control processing section 160 operates liquid feeding unit 140 to introduce the sample solution in chemical liquid chip 141 into channel 41 of analysis chip 10 (step S210). In channel 41, a detection object substance is captured on metal film 30 by an antigen-antibody reaction (primary reaction). Thereafter, the sample solution in channel 41 is removed, and the interior of channel 41 is washed with the washing solution. It is to be noted that when moisturizing agent is present in channel 41 of analysis chip 10, the interior of channel 41 is washed prior to the introduction of the sample solution to remove the moisturizing agent so that the capturing body can appropriately capture the detection object substance.

Next, control processing section 160 operates conveyance stage 152 to move analysis chip 10 to a position near the measurement position (step S215).

Next, control processing section 160 operates excitation light irradiating unit 110, excitation light detecting unit 120 and conveyance stage 152 to acquire the position information of analysis chip 10 and the output information of excitation light irradiating unit 110. On the basis of the acquired position information, control processing section 160 adjusts the position of analysis chip 10 (step S220).

As illustrated in FIG. 11A, in this step, first, analysis chip 10 held by chip holder 154 is irradiated with excitation light α, and reflection light β of excitation light α reflected by the surface of analysis chip 10 is detected, thereby acquiring the position information of analysis chip 10 and the output information of excitation light irradiating unit 110 (information relating to the power) (step S2201). The output information acquired at this time is recorded in control processing section 160.

On the basis of the position information of analysis chip 10, control processing section 160 adjusts the position of analysis chip 10 (step S2202). The step of acquiring the position information of analysis chip 10 and the output information of excitation light irradiating unit 110 (step S2201) is similar to step S1201, and the step of disposing analysis chip 10 at an appropriate measurement position on the basis of the acquired position information (step S2202) is similar to step S1204, and therefore, the descriptions thereof will be omitted.

Next, control processing section 160 detects the enhancement angle as in step S125 (step S225).

Next, control processing section 160 measures and records the optical blank value as in step S130 (step S230).

Next, control processing section 160 operates conveyance stage 152 to move analysis chip 10 to a liquid feeding position (step S235).

Next, control processing section 160 labels the detection object substance captured on metal film 30 with the fluorescence material as in step S140 (step S240).

Next, control processing section 160 operates conveyance stage 152 to move analysis chip 10 to an appropriate measurement position determined in step S220 (step S245).

Next, control processing section 160 detects fluorescence γ emitted from the fluorescence material labelling the detection object substance captured by the capturing body as in step S150 (step S250).

Finally, control processing section 160 calculates the amount, the concentration and the like of the detection object substance (step S255).

As illustrated in FIG. 11B, first, the optical blank value is subtracted from the detection value of fluorescence γ, and the fluorescence intensity correlating with the amount of the detection object substance is calculated (step S2551).

Next, on the basis of the output information acquired in step S2201, control processing section 160 determines whether the power of excitation light irradiating unit 110 is normal (step S2552). In control processing section 160, the detection value of reflection light β detected in step S2201 and the initial value of reflection light β are stored. Control processing section 160 compares the detection value and the initial value to determine whether the power of excitation light irradiating unit 110 is normal.

When it is determined that the power of excitation light irradiating unit 110 is lowered (abnormal), control processing section 160 corrects the fluorescence intensity calculated in step S2551 (step S2553). To be more specific, on the basis of the detection value and the initial value of reflection light β, control processing section 160 calculates the degree of the reduction of the power of excitation light irradiating unit 110, and multiplies the fluorescence intensity calculated in step S2551 by a correction coefficient (for example, 100/70 when the power of excitation light irradiating unit 110 is lowered to 70%) configured to make up the power reduction. In this manner, control processing section 160 corrects the calculated fluorescence intensity. The corrected fluorescence intensity is converted to the amount, the concentration, and the like of the detection object substance as necessary.

Through the above-mentioned procedure, the presence or the amount of the detection object substance in the sample solution can be detected.

Effect

In the above-mentioned manner, the surface plasmon resonance fluorescence analysis method and the surface plasmon resonance fluorescence analysis apparatus (SPFS apparatus 100) according to the present embodiment can acquire the output information (information relating to the power) of excitation light irradiating unit 110 by detecting reflection light β of excitation light α. Reflection light β that is reflected at the surface (in the present embodiment, incidence surface 21) of analysis chip 10 is approximately several percent of excitation light α from excitation light irradiating unit 110, and therefore first light receiving sensor 121 is not saturated. Accordingly, the analysis method and SPFS apparatus 100 according to the present embodiment can correctly determine whether excitation light irradiating unit 110 is in a normal condition, and can prevent detection errors due to abnormality in excitation light irradiating unit 110, without separately using a light quantity adjustment means. In addition, the task and the cost for maintenance such as replacing and cleaning of a light quantity adjusting component can be reduced.

Further, since analysis chip 10 is replaced for each analysis and excitation light α from excitation light irradiating unit 110 is always reflected by a clean surface, there is no influence of the aging of the reflecting surface, dust, and the like. Also in view of this, it is possible to correctly determine whether excitation light irradiating unit 110 is in a normal condition.

Embodiment 2

In Embodiment 2, an SPFS apparatus that can acquire information relating to the power of excitation light irradiating unit 110 and the irradiation direction of excitation light α as output information of the excitation light irradiating unit (excitation light irradiating section) is described.

SPFS apparatus 200 according to Embodiment 2 is different from SPFS apparatus 100 according to Embodiment 1 only in configuration of first light receiving sensor 221 of excitation light detecting unit 220. In view of this, only the configuration of first light receiving sensor 221 in SPFS apparatus 200 is described below, and the components identical to those of SPFS apparatus 100 according to Embodiment 1 are denoted with the same reference numerals, and, the description thereof will be omitted. In addition, analysis chip 10 used in SPFS apparatus 200 according to Embodiment 2 is identical to analysis chip 10 used in SPFS apparatus 100 according to Embodiment 1, and therefore the description thereof will be omitted.

Configuration of SPFS Apparatus

FIG. 1 is a schematic view illustrating a configuration of a surface plasmon resonance fluorescence analysis apparatus (SPFS apparatus) 100 according to Embodiment 2 of the present invention. As illustrated in FIG. 1, SPFS apparatus 100 includes excitation light irradiating unit (excitation light irradiating section) 110, excitation light detecting unit (excitation light detecting section) 220, fluorescence detecting unit (fluorescence detecting section) 130, liquid feeding unit 140, conveyance unit 150 and control processing section (processing section) 160.

Excitation light detecting unit 220 includes first light receiving sensor 221 and first sensor controlling section 122.

First light receiving sensor 221 detects the quantity and the position of reflection light β. For example, light receiving sensor 221 is a position detection device (PSD) or a photodiode (PD) including a plurality of light reception surfaces. In the case where first light receiving sensor 221 is a PD including a plurality of light reception surfaces, the number of the light reception surfaces of first light receiving sensor 221 is preferably, but not limited to, four or more. In the present embodiment, first light receiving sensor 221 is a PD including four light reception surfaces. In addition, in the case where first light receiving sensor 221 is a PSD, the size of the light reception surface of first light receiving sensor 221 is set to a size greater than the beam diameter of excitation light α from the viewpoint of correctly detecting the irradiation position of excitation light α. For example, in the case where the beam diameter of excitation light α is approximately 1 to 1.5 mm, the length of one side of the light reception surface of first light receiving sensor 221 is preferably 3 mm or greater.

First light receiving sensor 221 is disposed at a position where reflection light β of excitation light α reaches. In the present embodiment, first light receiving sensor 221 is disposed at a position where reflection light β from incidence surface 21 reaches. Preferably, first light receiving sensor 221 is disposed at a position where reflection light β of excitation light α emitted at an angle for the detection of fluorescence γ or an angle approximately equal to the angle for the detection of fluorescence γ reaches. The irradiation position of excitation light α (irradiation position) slightly varies depending on variation of the incident angle, and therefore, by setting the incident angle of excitation light α for positioning of analysis chip 10 and the incident angle of excitation light α for detection of fluorescence γ to values equal to or approximately equal to each other, the accuracy of positioning at the time of detection of fluorescence γ can be enhanced. In the present embodiment, in the case where the emission angle of excitation light α to the normal of metal film 30 (straight line along the z-axis direction in FIG. 1) is approximately 70 degrees, reflection light β from incidence surface 21 advances in a direction approximately parallel to the travelling direction of the conveyance stage (x-axis direction in FIG. 1). Accordingly, first light receiving sensor 221 is disposed at a position where the reflection light β that travels in parallel reaches.

SPFS Apparatus Detection Operation

Next, a detection operation of SPFS apparatus 200 (the surface plasmon resonance fluorescence analysis method according to the present embodiment) is described. In the present embodiment, SPFS apparatus 200 acquires information relating to the power of excitation light irradiating unit 110 and the irradiation direction of excitation light α as output information of excitation light irradiating unit 110. Then, when it is determined that the power of excitation light irradiating unit 110 is abnormal, SPFS apparatus 200 adjusts the power of excitation light irradiating unit 110. In addition, when it is determined that the irradiation direction of excitation light α is abnormal, excitation light irradiating unit 110 stops the subsequent operations.

Figure 12:
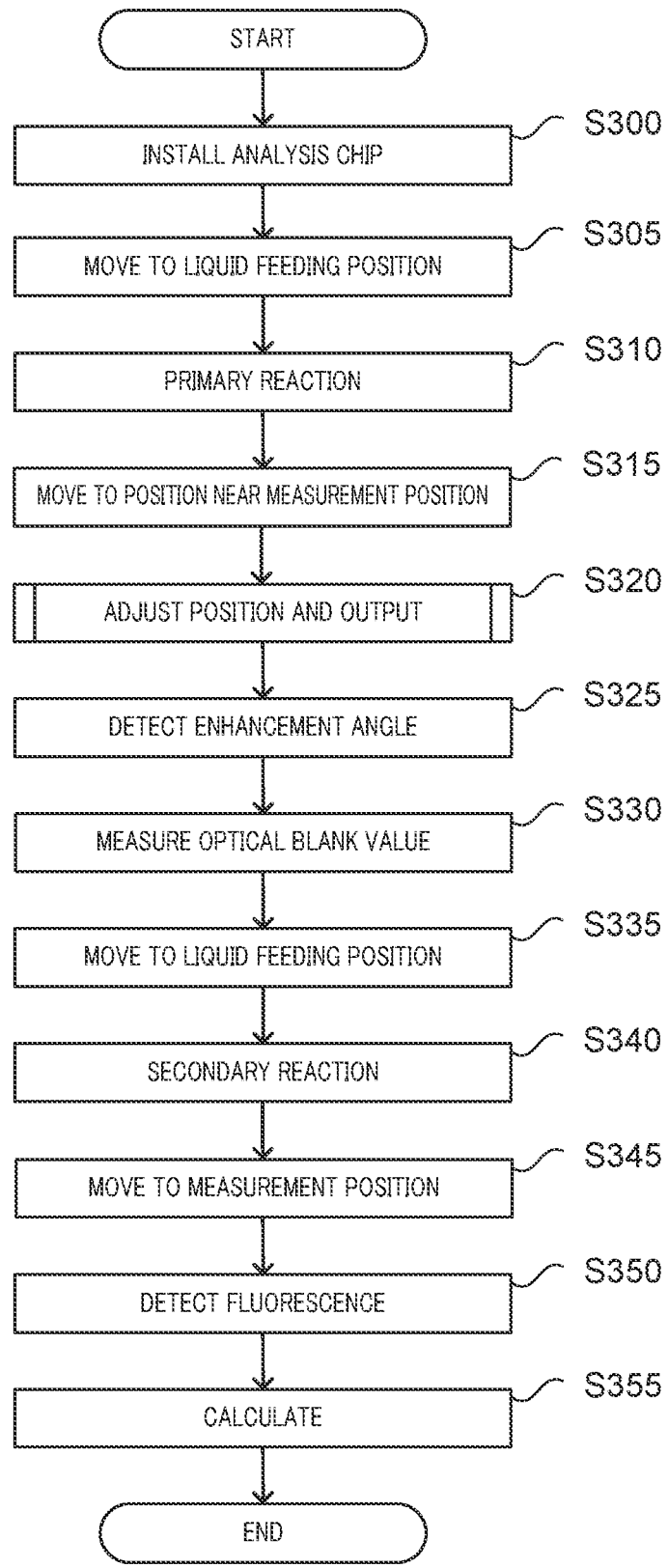
FIG. 12 is a flowchart of an exemplary procedure of an operation of the SPFS apparatus according to Embodiment 2 of the present invention.
Figure 13:
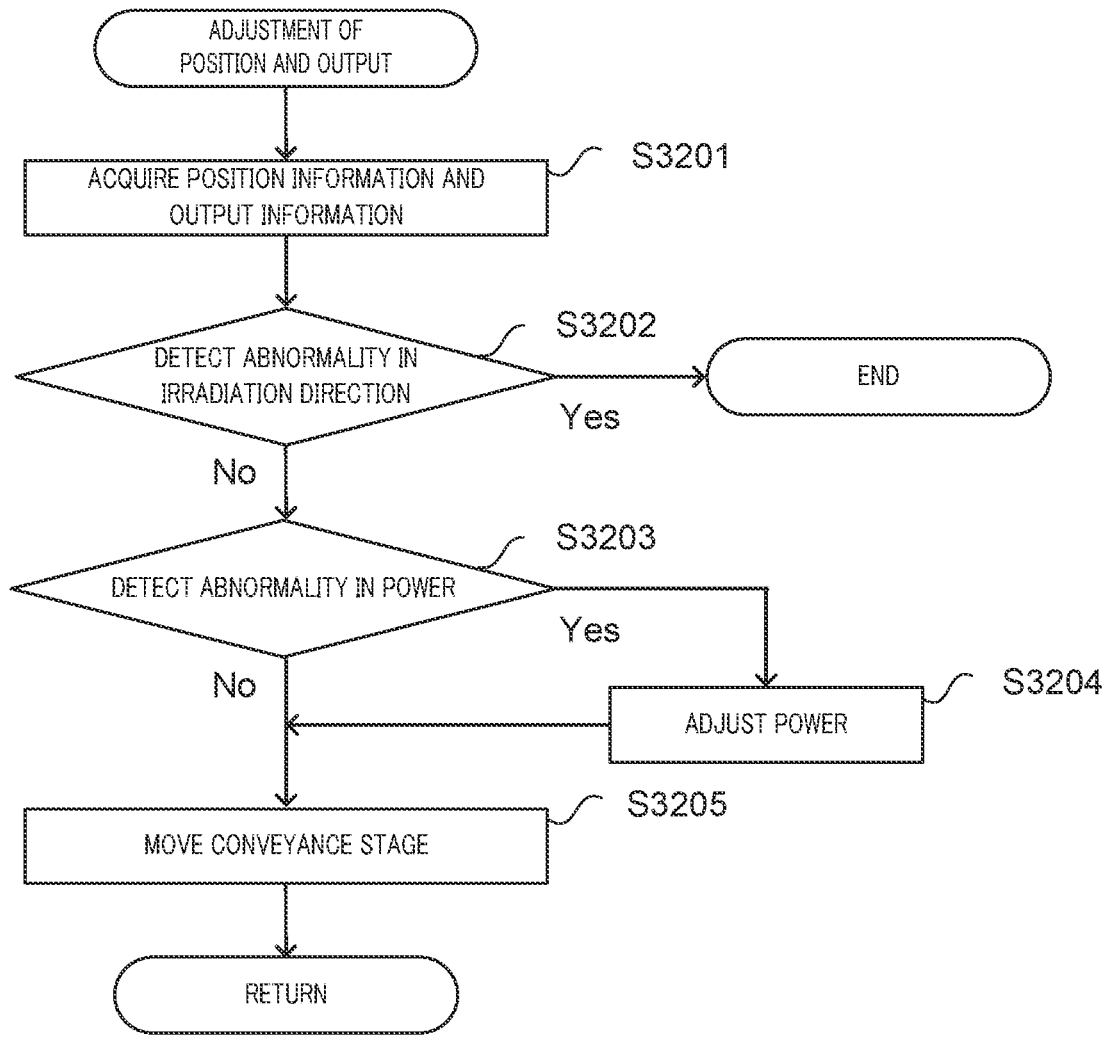
FIG. 13 is a flowchart of steps in a step of adjusting the position and the output (step S320) illustrated in FIG. 12.

FIG. 12 is a flowchart of an exemplary procedure of an operation of SPFS apparatus 200. FIG. 13 is a flowchart of steps in the step of adjusting the position and the output illustrated in FIG. 12 (step S320). In the present embodiment, the abnormality detection step (step S3202 and step S3203) is included in the step of adjusting the position and the output (step S320).

First, analysis chip 10 is installed at an installation position of SPFS apparatus 200 (step S300). To be more specific, analysis chip 10 is installed in chip holder 154 of SPFS apparatus 200.

Next, control processing section 160 operates conveyance stage 152 to move analysis chip 10 to a liquid feeding position (step S305).

Next, control processing section 160 operates liquid feeding unit 140 to introduce the sample solution in chemical liquid chip 141 into channel 41 of analysis chip 10 (step S310). In channel 41, a detection object substance is captured on metal film 30 by an antigen-antibody reaction (primary reaction). Thereafter, the sample solution in channel 41 is removed, and the interior of channel 41 is washed with the washing solution. It is to be noted that when moisturizing agent is present in channel 41 of analysis chip 10, the interior of channel 41 is washed prior to the introduction of the sample solution to remove the moisturizing agent so that the capturing body can appropriately capture the detection object substance.

Next, control processing section 160 operates conveyance stage 152 to move analysis chip 10 to a position near the measurement position (step S315).

Next, control processing section 160 operates excitation light irradiating unit 110, excitation light detecting unit 220 and conveyance stage 152 to acquire the position information of analysis chip 10 and the output information of excitation light irradiating unit 110. Control processing section 160 adjusts the position of analysis chip 10 on the basis of the acquired position information, and adjusts the output of excitation light irradiating unit 110 on the basis of the acquired output information (step S320). In addition, when it is determined that the irradiation direction of excitation light α of excitation light irradiating unit 110 is abnormal on the basis of the acquired output information, control processing section 160 stops the subsequent steps.

On the basis of the acquired output information, control processing section 160 determines whether the irradiation direction of excitation light α from excitation light irradiating unit 110 is normal (step S3202). In control processing section 160, information relating to the irradiation direction of excitation light α of excitation light irradiating unit 110 in the initial state is stored. To be more specific, in control processing section 160, information relating to the irradiation position of reflection light β with respect to first light receiving sensor 221 (hereinafter referred to also simply as "initial position") is stored. As elaborated later, control processing section 160 compares the position of the irradiation spot on first light receiving sensor 221 of reflection light β detected in step S3201 with the initial position preliminarily stored in control processing section 160 to determine whether the irradiation direction of excitation light α from excitation light irradiating unit 110 is normal.

When it is determined that the irradiation direction of excitation light α is normal, control processing section 160 continues the subsequent operations, whereas when it is determined that the irradiation direction of excitation light α is shifted from the desired direction (abnormal), control processing section 160 terminates the operation.

The step of detecting abnormality in the power (step S3203), the step of adjusting the power of excitation light irradiating unit 110 (step S3204), the step of disposing analysis chip 10 at an appropriate measurement position on the basis of the position information of analysis chip 10 (step S3205) are respectively similar to steps S1202 to S1204 of Embodiment 1, and therefore the descriptions thereof will be omitted.

Figure 14:
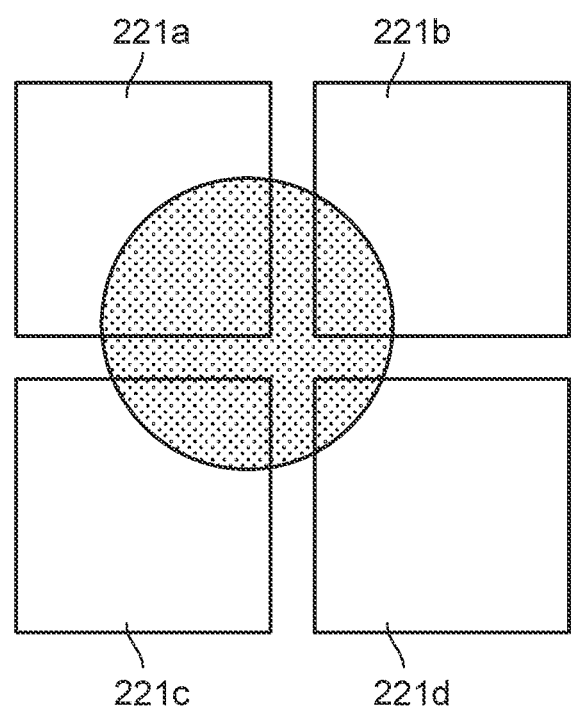
FIG. 14 is a schematic view for describing a step of acquiring output information of the excitation light irradiating unit (step S3201) in the case where a PD including four light reception surfaces is used.

FIG. 14 is a schematic view for describing the step (step S3201) of acquiring the output information of excitation light irradiating unit 110 (information relating to the power and the irradiation direction of excitation light α) in the case where a PD including four light reception surfaces is used. In FIG. 14, the dotted area indicates an irradiation spot of excitation light α applied to light reception surfaces 221a to 221d of first light receiving sensor 221.

As illustrated in FIG. 14, in the present embodiment, first light receiving sensor 221 is a PD including four light reception surfaces, 221a to 221d. When excitation light α hits light reception surfaces 221a to 221d, photoelectric currents $I_a$ to $I_d$ corresponding to the quantity of applied reflection light β are generated in light reception surfaces 221a to 221d, respectively. By comparing the values of photoelectric currents $I_a$ to $I_d$ output from light reception surfaces 221a to 221d, the irradiation positions of excitation light α in light reception surfaces 221a to 221d in the plane direction can be specified. On the basis of the irradiation positions of reflection light β on first light receiving sensor 221, control processing section 160 can acquire information relating to the irradiation direction of excitation light α. For example, the irradiation position of reflection light β in the vertical direction in FIG. 14 can be specified on the basis of the ratio of $(I_a+I_b):(I_c+I_d)$, and the irradiation positions of reflection light β in the lateral direction in FIG. 14 can be specified on the basis of the ratio of $(I_a+I_c):(I_b+I_d)$. In the present embodiment, in control processing section 160, photoelectric current values $I_a$ to $I_d$ output from light reception surfaces 221a to 221d of first light receiving sensor 221 are stored as the initial position, and control processing section 160 can determine whether the irradiation direction of excitation light α is shifted by comparing photoelectric current values $I_a$ to $I_d$ measured in step S3201 with preliminarily stored photoelectric current values $I_a$ to $I_d$.

In addition, in the present embodiment, control processing section 160 can measure the intensity of reflection light β on the basis of the sum $(I_a+I_b+I_c+I_d)$ of photoelectric currents $I_a$ to $I_d$ output from light reception surfaces 221a to 221d, and can acquire information relating to the power of excitation light irradiating unit 110. Control processing section 160 can determine whether the power of excitation light irradiating unit 110 is lowered by comparing the sum $(I_a+I_b+I_c+I_d)$ of photoelectric currents $I_a$ to $I_d$ measured in step S3201 with the sum $(I_a+I_b+I_c+I_d)$ of preliminarily stored photoelectric currents $I_a$ to $I_d$.

It is to be noted that the order of the step of detecting abnormality in the irradiation direction of excitation light α (step S3202) and the step of detecting abnormality in the power of excitation light irradiating unit 110 (step S3203) is not limited to the above-mentioned order, and the step of detecting abnormality in the irradiation direction of excitation light α (step S3202) may be performed after the step of detecting abnormality in the power (step S3203).

In addition, also when a PSD is used instead of a PD as first light receiving sensor 221, the output information of excitation light irradiating unit 110 (information relating to power and the irradiation direction of excitation light α) can be acquired. In a PD including a plurality of divided light reception surfaces, reflection light β incident on a region between adjacent light reception surfaces (region where excitation light β is not received) is not detected, and consequently the quantity of reflection light β cannot be wholly detected. With a PSD, in contrast, the quantity of reflection light β can be wholly detected since the light reception surface of a PSD is one continuous surface. It is therefore preferable to use a PSD as first light receiving sensor 221 from the viewpoint of more correctly detecting the quantity of reflection light β.

Next, control processing section 160 detects the enhancement angle as in step S125 (step S325).

Next, control processing section 160 measures and records the optical blank value as in step S130 (step S330).

Next, control processing section 160 operates conveyance stage 152 to move analysis chip 10 to a liquid feeding position (step S335).

Next, control processing section 160 labels the detection object substance captured on metal film 30 with the fluorescence material as in step S140 (step S340).

Next, control processing section 160 operates conveyance stage 152 to move analysis chip 10 to an appropriate measurement position determined in step S320 (step S345).

Next, control processing section 160 detects fluorescence γ emitted from the fluorescence material labelling the detection object substance captured by the capturing body as in step S150 (step S350).

Finally, control processing section 160 subtracts the optical blank value from the detection value of fluorescence γ to calculate the fluorescence intensity correlating with the amount of the detection object substance (step S355). The intensity of the detected fluorescence is converted to the amount, the concentration, and the like of the detection object substance as necessary.

Through the above-mentioned procedure, the presence or the amount of the detection object substance in the sample solution can be detected.

Effect

The analysis method and the SPFS apparatus according to Embodiment 2 can detect abnormality in the irradiation direction of excitation light α from excitation light irradiating unit 110 while achieving the effect of Embodiment 1.

Figure 15:
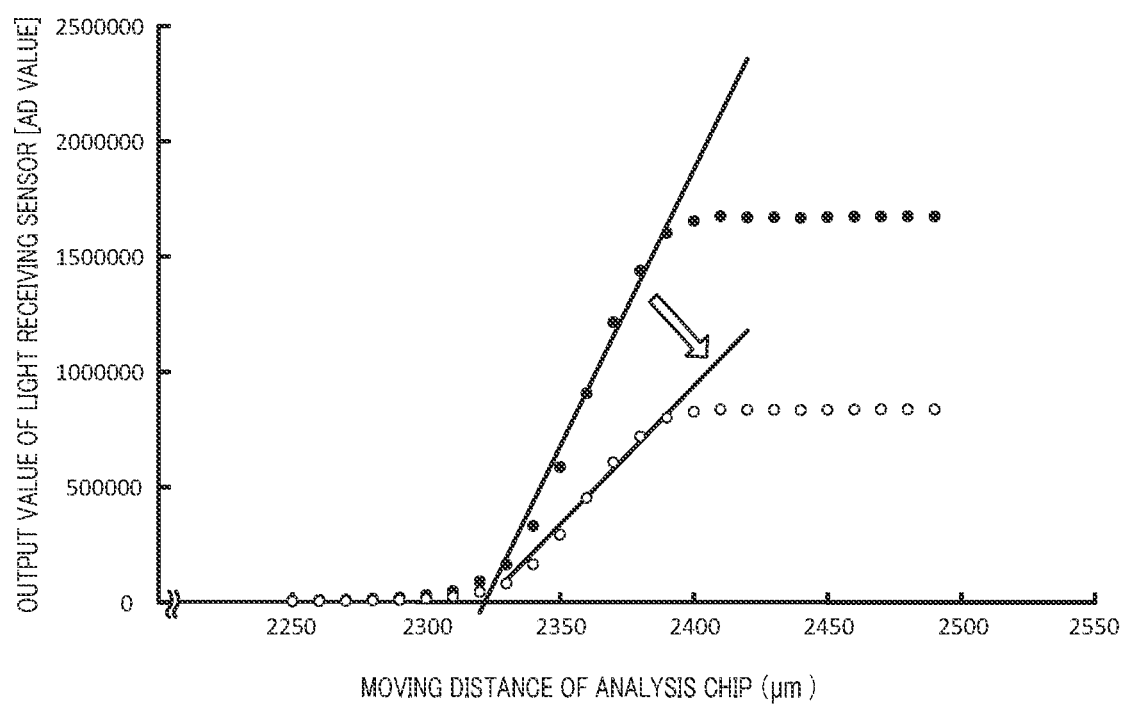
FIG. 15 is a graph for describing another method for acquiring information relating to the power of the excitation light irradiating unit.

While the information relating to the power of excitation light irradiating unit 110 is acquired on the basis of the point B in FIG. 5B (the maximum value of the intensity of reflection light β) in the analysis method and the SPFS apparatus according to Embodiments 1 and 2, the surface plasmon resonance fluorescence analysis method and the surface plasmon resonance fluorescence analysis apparatus according to embodiments of the present invention are not limited to this. FIG. 15 is a graph for describing another method for acquiring information relating to the power of the excitation light irradiating unit. For example, the information relating to the power of excitation light irradiating unit 110 may be acquired on the basis of the inclination of a straight line between point A and point C (a ratio of a variation of a reflection light intensity to a variation of a moving distance of analysis chip 10) instead of the point B in FIG. 5B. In this case, in control processing section 160, the inclination of the straight line between point A and point C is stored as the information relating to the power of excitation light irradiating unit 110. In FIG. 15, the black circle (●) indicates a detection result of reflection light by the first light receiving sensor in the case where excitation light irradiating unit 110 of the initial state is used, and the white circle (○) indicates a detection result of reflection light by the first light receiving sensor in the case where excitation light irradiating unit 110 in a low power state is used. Here, a result of the case where the power of excitation light irradiating unit 110 is lowered to ½ of the power of the initial state is illustrated. As illustrated in FIG. 15, compared with the case where excitation light irradiating unit 110 of the initial state is used, the maximum value of reflection light β obtained with excitation light irradiating unit 110 in a low power state is halved. In turn, the inclination of the inclined part (moving distance: approximately 2320 to approximately 2380 μm) is also halved. In this manner, the information relating to the power of excitation light irradiating unit 110 can be acquired also on the basis of a ratio of a variation of a reflection light intensity to a variation of a moving distance of analysis chip 10.

In addition, in the present invention, the order of the steps of the analysis method is not limited to Embodiments 1 and 2.

For example, the position of analysis chip 10 may be adjusted before the power of excitation light irradiating unit 110 is adjusted, or after the power of excitation light irradiating unit 110 is adjusted, or, while the power of excitation light irradiating unit 110 is adjusted.

In addition, the enhancement angle may be detected (steps S125, S225, S325) before the primary reaction (steps S110, S210, S310). In this case, the adjustment of the position (position and output) (steps S120, S220, S320) is also performed before the primary reaction (steps S110, S210, S310). In this manner, it is possible to omit the step of moving analysis chip 10 to the liquid feeding position (steps S135, S235, S335) that is performed between the primary reaction (steps S120, S220, S320) and the secondary reaction (steps S140, S240, S340) in the flowcharts of FIGS. 2, 10, and 12. In addition, the positional accuracy in the step of moving analysis chip 10 to the liquid feeding position (steps S105, S205, S305) prior to the primary reaction (steps S120, S220, S320) is enhanced, and, in the primary reaction (steps S120, S220, S320) and the secondary reaction (steps S140, S240, S340), an end of syringe 144 of liquid feeding unit 140 can be more surely inserted into analysis chip 10. This lowers the degree of the positional accuracy of analysis chip 10 required in the step of installing analysis chip 10 to chip holder 154 for the user (steps S100, S200, S300), thus improving usability.

While the step of labelling the detection object substance with a fluorescence material (the secondary reaction; steps S140, S240, S340) is performed (two step method) after the step of causing a reaction between the detection object substance and the capturing body (primary reaction; steps S110, S210, S310) in the above description, the timing when the detection object substance is labeled with the fluorescence material is not limited. For example, the labeling solution may be added to the sample solution to preliminarily label the detection object substance with the fluorescence material before the sample solution is introduced into the channel of analysis chip 10. In addition, the sample solution and the labeling solution may be simultaneously injected into the channel of analysis chip 10. In the former case, by injecting the sample solution into the channel of analysis chip 10, the detection object substance labeled with the fluorescence material is captured by the capturing body. In the latter case, the detection object substance is labeled with the fluorescence material while the detection object substance is captured by the capturing body. In either case, by introducing the sample solution into the channel of analysis chip 10, both the primary reaction and the secondary reaction can be completed (one step method). In the case where this one step method is employed, the detection of the enhancement angle (step S125, S225, S325) is performed before the antigen-antibody reaction, and the adjustment of the position (position and output) is performed (steps S120, S220, S320) before the detection of the enhancement angle.

Further, while the position information is obtained together with the output information in Embodiments 1 and 2, the surface plasmon resonance fluorescence analysis method and the surface plasmon resonance fluorescence analysis apparatus according to the embodiments of the present invention are not limited to this. For example, the surface plasmon resonance fluorescence analysis method and the surface plasmon resonance fluorescence analysis apparatus according to the embodiments of present invention may be used only for acquiring the output information.

Reference Experiment

1. Relationship Between Incident Angle and Reflectivity of Excitation Light

First, the relationship between the incident angle and the reflectivity of excitation light on a prism was calculated. The refractive index of the prism was set to 1.5. Calculation results are shown in FIGS. 16A and 16B.

Figure 16A:
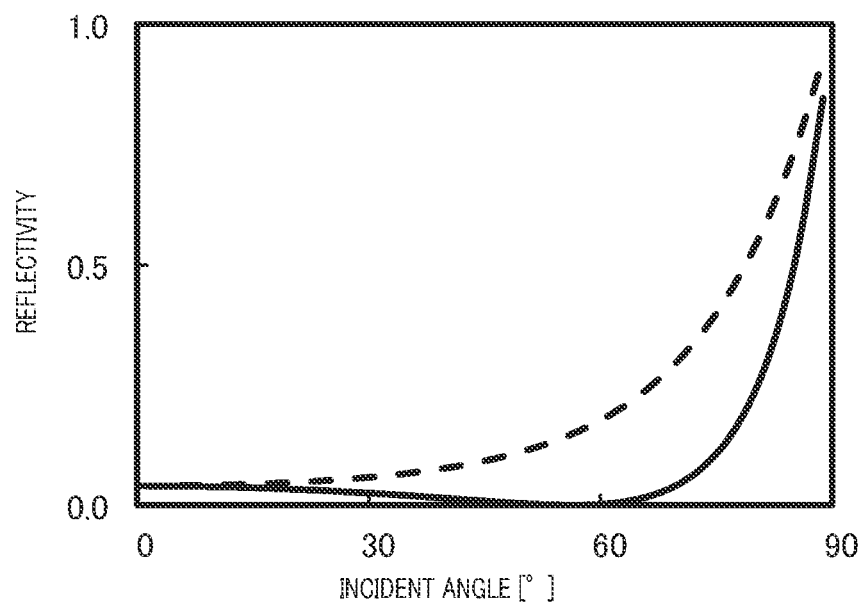
FIGS. 16A and 16B are graphs showing a relationship between the incident angle and the reflectivity of excitation light.
Figure 16B:
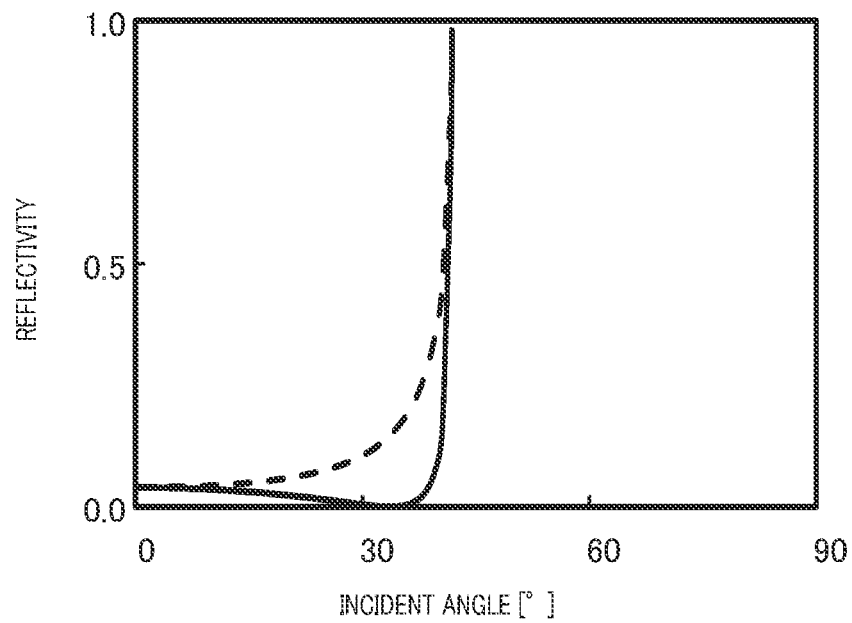

FIGS. 16A and 16B are graphs showing a relationship between the incident angle and the reflectivity of excitation light. FIG. 16A shows a result of the case where excitation light hits the surface of the prism from the outside of the prism, and FIG. 16B shows a result of the case where excitation light hits the surface of the prism from the inside of the prism. In FIGS. 16A and 16B, the solid line indicates p-polarized light, and the broken line indicates s-polarized light.

As shown in FIGS. 16A and 16B, it was confirmed that the reflectivity of the excitation light is substantially constant when the incident angle of excitation light to the prism is small.

2. Relationship Between Reflectivity and Refractive Index of Prism

Next, the relationship between the refractive index of the prism and the reflectivity of p-polarized light of excitation light was calculated. In this example, the incident angle of the excitation light to the incidence surface was set to 9 degrees (0.158 rad) such that the incident angle to the metal film is 71 degrees. Using a refractive index 1.527 of a prism as a reference, the reflectivity of the excitation light in the case where the refractive index is varied by ±0.002 from the reference refractive index, and the reflectivity of the excitation light in the case where the refractive index is varied by ±0.003 from the reference refractive index were calculated. Results of the calculation are shown in Table 1. The refractive index variation is a variation in refractive index with respect to the reference refractive index 1.527. In addition, the change rate of reflectivity [%] is a change rate with respect to a reference reflectivity obtained with a prism having a refractive index of 1.527.

TABLE 1

| Refractive index | Refractive index variation | Reflectivity of p-polarized light [%] | Change rate of reflectivity [%] |
| --- | --- | --- | --- |
| 1.527 | 0 | 4.2067 | 0 |
| 1.529 | +0.002 | 4.2322 | +0.61 |
| 1.525 | −0.002 | 4.1813 | −0.61 |
| 1.530 | +0.003 | 4.2450 | +0.91 |
| 1.524 | −0.003 | 4.1686 | −0.91 |

As shown in Table 1, when the prism having a refractive index of 1.527 was used, the reflectivity of the p-polarized light of the excitation light was approximately 4.2%. Meanwhile, when the variation of the refractive index was ±0.002, the change rate of the reflectivity was approximately ±0.61%, and when the variation of the refractive index was ±0.003, the change rate of the reflectivity was approximately ±0.91%. That is, it was confirmed that as long as the variation of the refractive index is approximately ±0.003, the change rate of the reflectivity is 1% or lower and the reflectivity is substantially constant.

Accordingly, it was confirmed that abnormality in the power can be correctly detected by detecting reflection light of excitation light from the prism so as to acquire information relating to the power of the excitation light irradiating unit since, when the incident angle of the excitation light to the prism is small, the reflectivity of the excitation light is substantially constant as long as the prism is made of the same material.

This application is entitled to and claims the benefit of Japanese Patent Application No. 2015-223059 filed on Nov. 13, 2015, the disclosure each of which including the specification, drawings and abstract is incorporated herein by reference in its entirety.

INDUSTRIAL APPLICABILITY

The surface plasmon resonance fluorescence analysis method and the surface plasmon resonance fluorescence analysis apparatus according to the embodiments of the present invention can detect a detection object substance with high reliability, and therefore is suitable for laboratory test and the like, for example.

REFERENCE SIGNS LIST

10, 10' Analysis chip
20 Prism
21 Incidence surface
22 Film formation surface
23 Emission surface
30 Metal film
40 Channel closure
41 Channel
42 Spacer
100, 200 SPFS apparatus
110 Excitation light irradiating unit
111 Light source unit
112 Angle adjusting mechanism
113 Light source controlling section
120, 220 Excitation light detecting unit
121, 221 First light receiving sensor
221a to 221d Light reception surface
122 First sensor controlling section
130 Fluorescence detecting unit
131 Light receiving unit
132 Position switching mechanism
133 Second sensor controlling section
134 First lens
135 Optical filter
136 Second lens
137 Second light receiving sensor
140 Liquid feeding unit
141 Chemical liquid chip
142 Syringe pump
143 Liquid feed pump driving mechanism
144 Syringe
145 Plunger
150 Conveyance unit
152 Conveyance stage
154 Chip holder
160 Control processing section
α Excitation light
β reflection light of excitation light
γ Fluorescence
δ Plasmon scattering light

The invention claimed is:
1. A surface plasmon resonance fluorescence analysis method, comprising the steps:
applying excitation light generated by an excitation light generator to an analysis chip disposed in a chip holder and detecting fluorescence that is emitted by a fluorescence material when the fluorescence material is excited by the excitation light, the detected fluorescence indicating a presence or an amount of a detection object based on a surface plasmon resonance,
acquiring output information by applying excitation light from the excitation light irradiator to the analysis chip and by detecting reflection light, the reflection light being a part of the excitation light that is reflected by at least an incidence surface of the analysis chip, the output information being based on the reflection light and including a power of the excitation light generated by the excitation light irradiator, the analysis chip including a prism including the incidence surface and a film formation surface, a metal film disposed on the film formation surface, and a capturing body fixed on the metal film, and determining whether the excitation light irradiator is in a normal condition in accordance with the output information, wherein the step of determining whether the excitation light irradiator is in a normal condition includes comparing the output information of the excitation light irradiator with preliminarily acquired output information that serves as a reference of the excitation light irradiator, the preliminarily acquired output information being output information of the excitation light irradiator in an initial state.

2. The surface plasmon resonance fluorescence analysis method according to claim 1 further comprising acquiring position information of the analysis chip by applying excitation light from the excitation light irradiator to the analysis chip installed in the chip holder fixed on a conveyance stage, and by detecting the reflection light, which is the excitation light reflected by at least the incidence surface of the analysis chip.

3. The surface plasmon resonance fluorescence analysis method according to claim 2, wherein the acquiring the output information of the excitation light irradiator and the acquiring the position information of the analysis chip are simultaneously performed by an excitation light detector using the same reflection light, and the detecting fluorescence is performed using a fluorescence detector that is separate from the excitation light detector.

4. The surface plasmon resonance fluorescence analysis method according to claim 2 further comprising:

moving the analysis chip to a measurement position by moving the chip holder by the conveyance stage based on the position information; and applying excitation light to the analysis chip disposed at the measurement position from the excitation light irradiator to detect fluorescence emitted from the fluorescence material labelling the detection object substance captured by the capturing body.

5. The surface plasmon resonance fluorescence analysis method according to claim 1 further comprising applying excitation light to the analysis chip from the excitation light irradiator to detect fluorescence emitted from the fluorescence material labelling the detection object substance captured by the capturing body.

6. The surface plasmon resonance fluorescence analysis method according to claim 1, further comprising the step of correcting a detection value of the fluorescence in accordance with the output information.

7. The surface plasmon resonance fluorescence analysis method according to claim 1, wherein the step of determining whether the excitation light irradiator is in a normal condition includes determining that the excitation light irradiator is abnormal in a case where a difference between the output information of the excitation irradiator and the preliminarily acquired output information is greater than a predetermined threshold.

8. A surface plasmon resonance fluorescence analysis apparatus that detects presence or an amount of a detection object substance by detecting fluorescence that is emitted by a fluorescence material labelling the detection object substance when the fluorescence material is excited by localized light based on a surface plasmon resonance, the surface plasmon resonance fluorescence analysis apparatus comprising:

a chip holder for detachably holding an analysis chip including a prism including an incidence surface and a film formation surface, a metal film disposed on the film formation surface, and a capturing body fixed on the metal film;

an excitation light irradiator that applies excitation light to the analysis chip held by the chip holder;

an excitation light detector that detects reflection light, wherein the reflection light is a part of the excitation light reflected by at least the incidence surface of the analysis chip;

a fluorescence detector that detects fluorescence emitted from the fluorescence material labelling the detection object substance captured by the capturing body; and a processor that acquires output information based on a detection result of the excitation light detector, the output information including a power of the excitation light generated by the excitation light irradiator, and the processor being configured to determine whether the excitation light irradiator is in a normal condition in accordance with the output information, wherein the processor determines whether the excitation light irradiator is in a normal condition by comparing the output information of the excitation light irradiator with preliminarily acquired output information that serves as a reference of the excitation light irradiator, the preliminarily acquired output information being output information of the excitation light irradiator in an initial state.

9. The surface plasmon resonance fluorescence analysis apparatus according to claim 8 further comprising a conveyance stage that moves the chip holder, wherein the processor further acquires position information of the analysis chip held by the chip holder based on the detection result of the excitation light detector; and wherein the processor moves the analysis chip to a measurement position by causing the conveyance stage to move the chip holder based on the position information.

10. The surface plasmon resonance fluorescence analysis apparatus according to claim 8, wherein the excitation light detector is a photodiode including a plurality of light reception surfaces; and wherein the output information of the excitation light irradiator is information relating to a power of the excitation light irradiator and an irradiation direction of excitation light of the excitation light irradiator.

11. The surface plasmon resonance fluorescence analysis apparatus according to claim 8, wherein the excitation light detector is a position detection device; and wherein the output information of the excitation light irradiator is information relating to a power of the excitation light irradiator and an irradiation direction of the excitation light of the excitation light irradiator.

12. The surface plasmon resonance fluorescence analysis apparatus according to claim 8, wherein the processor is configured to correct a detection value of the fluorescence in accordance with the output information.

13. The surface plasmon resonance fluorescence analysis apparatus according to claim 8, wherein the processor determines that the excitation light irradiator is abnormal in a case where a difference between the output information of the excitation light irradiator and the preliminarily acquired output information is greater than a predetermined threshold.

\* \* \* \* \*